(12) United States Patent
Yoon et al.

(10) Patent No.: US 11,844,075 B2
(45) Date of Patent: Dec. 12, 2023

(54) METHOD AND APPARATUS FOR DETERMINING UPLINK CONTROL CHANNEL AND SIGNAL RESOURCE IN WIRELESS COMMUNICATION SYSTEM

(71) Applicant: Samsung Electronics Co., Ltd., Suwon-si (KR)

(72) Inventors: Suha Yoon, Suwon-si (KR); Jeongho Yeo, Suwon-si (KR); Jonghyun Bang, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 16/987,184

(22) Filed: Aug. 6, 2020

(65) Prior Publication Data

US 2021/0045105 A1 Feb. 11, 2021

(30) Foreign Application Priority Data

Aug. 6, 2019 (KR) .................. 10-2019-0095751
Aug. 16, 2019 (KR) .................. 10-2019-0100542
Aug. 30, 2019 (KR) .................. 10-2019-0107657

(51) Int. Cl.
*H04W 72/04* (2023.01)
*H04W 72/21* (2023.01)
(Continued)

(52) U.S. Cl.
CPC ........... *H04W 72/21* (2023.01); *H04L 1/1812* (2013.01); *H04L 5/0055* (2013.01); *H04W 72/23* (2023.01)

(58) Field of Classification Search
CPC .......... H04W 72/0413; H04W 72/042; H04W 72/1289; H04W 72/21; H04W 72/23;
(Continued)

(56) References Cited

U.S. PATENT DOCUMENTS 9,628,227 B2 * 4/2017 Aiba .................... H04L 5/0053
2013/0034073 A1 2/2013 Aiba et al.
(Continued)

FOREIGN PATENT DOCUMENTS

CN 103098536 A 5/2013

OTHER PUBLICATIONS

Samsung, "CR to 38.213 capturing the RAN1#94bis and RAN1#95 meeting agreements", 3GPP TSG RAN WG1 Meeting #95, Nov. 12-16, 2018, R1-1814394, 113 pages.
(Continued)

*Primary Examiner* — Hanh N Nguyen

(57) ABSTRACT

A method performed by a terminal in a wireless communication system includes: receiving at least one downlink control information (DCI) from a base station; determining a physical uplink control channel (PUCCH) resource based on the at least one DCI; and transmitting a PUCCH including hybrid automatic repeat request acknowledgement (HARQ-ACK) information to the base station based on the determined PUCCH resource, wherein the determining of the PUCCH resource comprises: in case that a physical downlink shared channel (PDSCH)-to-HARQ feedback timing indicator field is present in the at least one DCI, determining the PUCCH resource based on information in the PDSCH-to-HARQ feedback timing indicator field in the at least one DCI; and in case that the PDSCH-to-HARQ feedback timing indicator field is not present in the at least
(Continued)

one DCI, determining the PUCCH resource based on an radio resource control (RRC) signaling received from the base station.

8 Claims, 23 Drawing Sheets

(51) Int. Cl.
  *H04L 5/00* (2006.01)
  *H04L 1/1812* (2023.01)
  *H04W 72/23* (2023.01)
(58) Field of Classification Search
  CPC ... H04L 1/1812; H04L 5/0055; H04L 1/1671; H04L 1/1854; H04L 1/1864; H04L 5/0007
  See application file for complete search history.

(56) References Cited

U.S. PATENT DOCUMENTS

| | | | |
|---|---|---|---|
| 2019/0103947 A1 | 4/2019 | Park | |
| 2019/0158205 A1* | 5/2019 | Sheng | H04L 5/0048 |
| 2019/0222394 A1 | 7/2019 | Medles et al. | |
| 2019/0239187 A1 | 8/2019 | Islam et al. | |
| 2019/0306865 A1* | 10/2019 | Medles | H04L 5/0094 |
| 2021/0050936 A1* | 2/2021 | Seo | H04L 5/0053 |
| 2022/0052793 A1* | 2/2022 | Bao | H04L 1/1854 |
| 2022/0109528 A1* | 4/2022 | Babaei | H04L 1/1812 |

OTHER PUBLICATIONS

Huawei et al., "Correction on the timeline condition of multiplexing two HARQ-ACK information in one slot", Change Request, 3GPP TSG RAN WG1 Meeting #96bis, Apr. 8-12, 2019, R1-1905890, 5 pages.
CATT, "Corrections on carrier aggregation and bandwidth part operation", 3GPP TSG RAN WG1 Meeting #94, Aug. 20-24, 2018, R1-1808381, 14 pages.
Samsung, "Draft CR on description of PDSCH-to-HARQ_feedback timing indicator for TS38.213", 3GPP TSG RAN WG1 Meeting #98, Aug. 26-30, 2019, R1-1908456, 5 pages.
Notification of Transmittal of the International Search Report and the Written Opinion of the International Searching Authority, or the Declaration dated Oct. 30, 2020 in connection with International Patent Application No. PCT/KR2020/010433, 11 pages.
Supplementary European Search Report dated Aug. 2, 2022 in connection with European Patent Application No. 20 85 0032, 9 pages.
Office Action dated Oct. 12, 2023, in connection with Chinese Patent Application No. 202080056481.1, 16 pages.
Motorola Mobility et al, "PUCCH resource allocation for HARQ-ACK feedback to Msg4," 3GPP TSG RAN WG1 NR Ad-Hoc#2, R1-1711283, Qingdao, P. R. China, Jun. 2017, 4 pages.

* cited by examiner

BLOCK DIAGRAM OF CHANNEL CODING WITHOUT USING OUTER CODE

BLOCK DIAGRAM OF CHANNEL CODING USING OUTER CODE

METHOD AND APPARATUS FOR DETERMINING UPLINK CONTROL CHANNEL AND SIGNAL RESOURCE IN WIRELESS COMMUNICATION SYSTEM

CROSS-REFERENCE TO RELATED APPLICATIONS

This application is based on and claims priority under 35 U.S.C. § 119 to Korean Patent Application No. 10-2019-0095751 filed on Aug. 6, 2019, Korean Patent Application No. 10-2019-0100542 filed on Aug. 16, 2019, and Korean Patent Application No. 10-2019-0107657 filed on Aug. 30, 2019 in the Korean Intellectual Property Office, the disclosures of which are herein incorporated by reference in their entirety.

BACKGROUND

1. Field

The disclosure relates to a wireless communication system. More particularly, the disclosure relates to a method and apparatus for determining an uplink (UL) control channel and a signal resource in a wireless communication system.

2. Description of Related Art

To meet the soaring demand with respect to wireless data traffic after the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as beyond-4G-network communication systems or post-long term evolution (LTE) systems. It is considered that the 5G communication system will be implemented in millimeter wave (mmWave) bands, e.g., 60 GHz bands, so as to accomplish higher data rates.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. To implement the IoT, various technological elements, such as sensing technology, wired/wireless communication and network infrastructure, service interface technology, and security technology, are required, and recently technologies related to sensor networks for connecting objects, machine to machine (M2M), machine type communication (MTC), and so forth have been researched.

Various attempts have been made to apply 5G communication systems to IoT networks. For example, 5G communication, such as sensor networks, M2M, MTC, etc., has been implemented by schemes such as beamforming, multiple-input and multiple-output (MIMO), array antenna, and so forth. The application of cloud radio access network (RAN) as a Big Data processing technology may also be an example of the convergence of 5G technology and IoT technology.

As described above, various services may be provided as wireless communication systems develop, and accordingly, ways of smoothly providing such services are required.

SUMMARY

Disclosed embodiments provide a method and apparatus for effectively providing a service in a mobile communication system.

Additional aspects will be set forth in part in the description which follows and, in part, will be apparent from the description, or may be learned by practice of the presented embodiments of the disclosure.

According to an embodiment of the disclosure, a method performed by a terminal in a wireless communication system includes: receiving at least one downlink control information (DCI) from a base station; determining a physical uplink control channel (PUCCH) resource based on the at least one DCI; and transmitting a PUCCH including hybrid automatic repeat request acknowledgement (HARQ-ACK) information to the base station based on the determined PUCCH resource, wherein the determining of the PUCCH resource includes: in case that a physical downlink shared channel (PDSCH)-to-HARQ feedback timing indicator field is present in the at least one DCI, determining the PUCCH resource based on information in the PDSCH-to-HARQ feedback timing indicator field in the at least one DCI; and in case that the PDSCH-to-HARQ feedback timing indicator field is not present in the at least one DCI, determining the PUCCH resource based on an radio resource control (RRC) signaling received from the base station.

According to an embodiment of the disclosure, a terminal in a wireless communication system includes: a transceiver; and at least one controller configured to: receive at least one downlink control information (DCI) from a base station; determine a physical uplink control channel (PUCCH) resource based on the at least one DCI; and transmit a PUCCH including hybrid automatic repeat request acknowledgement HARQ-ACK information to the base station based on the determined PUCCH resource, wherein the at least one controller is further configured to: in case that a physical downlink shared channel (PDSCH)-to-HARQ feedback timing indicator field is present in the at least one DCI, determine the PUCCH resource based on information in the PDSCH-to-HARQ feedback timing indicator field in the at least one DCI; and in case that the PDSCH-to-HARQ feedback timing indicator field is not present in the at least one DCI, determine the PUCCH resource based on an radio resource control (RRC) signaling received from the base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
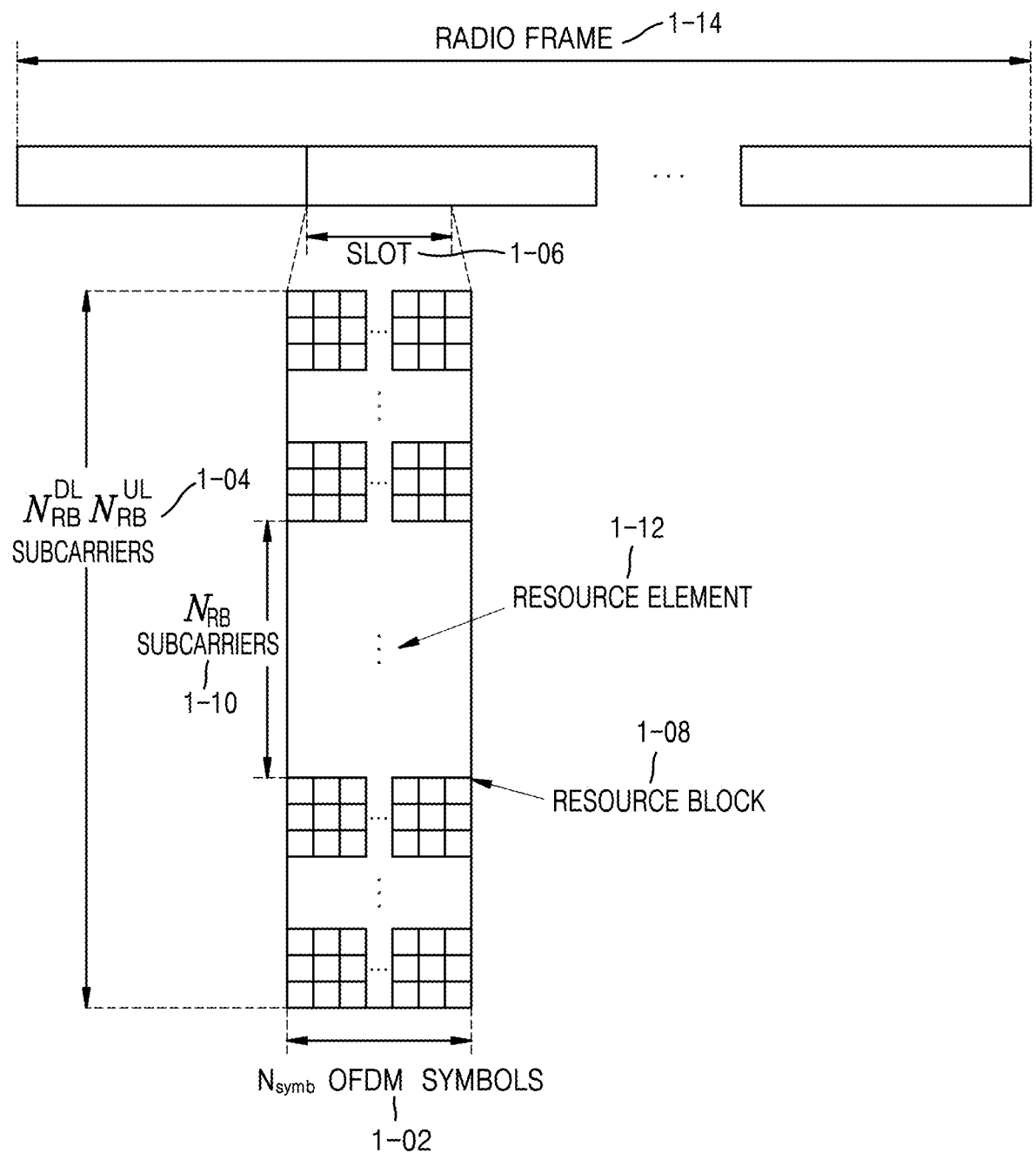
FIG. 1 illustrates a basic structure of a time-frequency domain in a new radio (NR) system to which an embodiment of the disclosure is applied.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

In the disclosure, a layer (or a layer apparatus) may also be referred to as an entity.

To meet the soaring demand with respect to wireless data traffic after the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as beyond-4G-network communication systems or post-long term evolution (LTE) systems. The 5G communication system prescribed in the $3^{rd}$ Generation Partnership Project (3GPP) is called a new radio (NR) system. To achieve higher data transmission rates, implementation of a 5G communication system in millimeter wave (mmWave) bands, e.g., 60 GHz bands, as well as a band similar to a frequency used in existing 3G/4G networks has been considered. In the 5G communication system, to alleviate propagation path loss of radio waves and to increase a propagation distance of radio waves in the ultra-high frequency band, beamforming, massive multi-input multi-output (MIMO), full dimensional MIMO (FD-MIMO), array antenna, analog beamforming, and large-scale antenna technologies have been discussed and have also been applied to NR systems. To improve system networks, in 5G communication systems, various technologies have been developed, such as, evolved or advanced small cell, cloud radio access network (cloud RAN), ultra-dense network, device-to-device (cloud RAN), wireless backhaul, moving network, cooperative communication, coordinated multi-point (CoMP), and interference cancellation. There are also other various schemes under development for the 5G system including, e.g., hybrid Frequency-Shift Keying (FSK) and Quadrature Amplitude Modulation (QAM) modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. To implement the IoT, various technological elements, such as sensing technology, wired/wireless communication and network infrastructure, service interface technology, and security technology, are required, and recently technologies related to sensor networks for connecting objects, machine to machine (M2M), machine type communication (MTC), and so forth have been researched. Such an IoT environment may provide intelligent Internet technology (IT) services that create new value in human life by collecting and analyzing data generated among connected objects. IoT may be applied to a variety of fields including smart homes, smart buildings, smart cities, smart cars or connected cars, smart grids, health care, smart appliances, advanced medical services, and so forth through convergence and combination between existing information technology (IT) and various industries.

Thus, various attempts have been made to apply 5G communication systems to IoT networks. For example, 5G communication, such as sensor networks, M2M, MTC, etc., has been implemented by a scheme such as beamforming, MIMO, array antenna, and so forth. The application of a cloud RAN as a Big Data processing technology may also be an example of the convergence of 5G technology and IoT technology.

New 5G communication, which is a new radio (NR) access technology, has been designed to allow various services to be freely multiplexed in time and frequency resources, and thus waveform/numerology, a reference signal, etc., may be dynamically or freely allocated according to the need of a service. To provide an optimal service to a terminal in wireless communication, optimized data transmission based on measurement of channel quality and interference quantity is needed, making accurate channel state measurement indispensable. However, unlike 4G communication in which channel and interference characteristics do not change largely with frequency resources, a 5G channel has channel and interference characteristics that change largely with a service, requiring support for a subset at a frequency resource group (FRG) level to allow separate measurement. In the NR system, a type of a supportable service may be categorized into enhanced mobile broadband (eMBB), massive machine type communication (mMTC), ultra-reliable and low-latency communication (URLLC), etc. The eMBB may be regarded as high-speed transmission of high-volume data, mMTC as minimization of power of the UE and accesses by multiple UEs, and URLLC as a service aiming at high reliability and low latency. Depending on a type of a service applied to the UE, different requirements may be applied.

Meanwhile, along with the recent on-going research on next-generation communication systems, various schemes for scheduling communication with the terminal have been discussed. Thus, there is a need for efficient scheduling and data transmission/reception schemes that consider characteristics of the next-generation communication systems.

As such, in a communication system, a plurality of services may be provided to a user, and to provide the plurality of services to the user, a method of providing each of the plurality of services in the same time period based on the characteristics and an apparatus using the method are required.

Hereinafter, embodiments of the disclosure will be described in detail with reference to the accompanying drawings.

When the embodiments of the disclosure are described, technical matters that are well known in a technical field of the disclosure and are not directly related to the disclosure will not be described. By omitting any unnecessary description, the subject matter of the disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments of the disclosure described below together with the attached drawings. However, the disclosure is not limited to the disclosed embodiments, but may be implemented in various manners, and the embodiments are provided to complete the disclosure of the disclosure and to allow those of ordinary skill in the art to understand the scope of the disclosure. The disclosure is defined by the category of the claims. Throughout the specification, an identical reference numeral will indicate an identical element.

Meanwhile, it is known to those of ordinary skill in the art that blocks of a flowchart and a combination of flowcharts may be represented and executed by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

In the current embodiment, the term '~unit', as used herein, denotes a software or hardware component, such as a field programmable gate array (FPGA) or application specific integrated circuit (ASIC), which performs certain tasks. However, the meaning of 'unit' is not limited to software or hardware. '~unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more CPUs in a device or a secure multimedia card. In the embodiments, '~unit' may include one or more processors.

A wireless communication system has evolved from an initial one that provides a voice-oriented service to a broadband wireless communication system that provides a high-speed and high-quality packet data service, like the communication standards, such as $3^{rd}$-Generation Partnership Project (3GPP) high speed packet access (HSPA), Long Term Evolution (LTE) or Evolved Universal Terrestrial Radio Access (E-UTRA), LTE-Advanced (LTE-A or E-UTRA Evolution), 3GPP2 high rate packet data (HRPD), Ultra Mobile Broadband (UMB), the Institute of Electrical and Electronics Engineers (IEEE) 802.16e, etc. As a 5G wireless communication system, 5G or NR communication standards have been established.

A 5G or NR system as a representative example of a broadband wireless communication system adopts orthogonal frequency division multiplexing (OFDM) in a DL and a UL. More specifically, cyclic-prefix (CP) OFDM is adopted in a DL, and discrete Fourier transform spreading (DFT-S) OFDM and CP-OFDM are adopted in a UL. The UL is a radio link through which a terminal transmits data or a control signal to a base station (gNodeB or BS), and the DL is a radio link through which the base station transmits data or a control signal to the terminal. The multiple access scheme separates data or control information for each user by allocating and operating time-frequency resources on which the data or the control information is carried for each user, so that the time-frequency resources do not overlap each other, that is, so that orthogonality is realized.

The 5G or NR system employs a hybrid automatic repeat request (HARQ) scheme that retransmits data in a physical layer when decryption fails in initial transmission of the data. HARQ refers to a scheme in which when a receiver fails to accurately decrypt (decode) data, the receiver transmits information indicating a decoding failure, i.e., a negative acknowledgement (NACK), to a transmitter to allow the transmitter to retransmit the data in the physical layer. The receiver may improve data reception performance by combining the data retransmitted by the transmitter with data that fails to be decoded previously. When accurately decoding the data, the receiver transmits information indicating a decoding success, i.e., an acknowledgement (ACK), to the transmitter to allow the transmitter to transmit new data.

FIG. 1 illustrates a basic structure of a time-frequency domain in an NR system to which an embodiment of the disclosure is applied. More specifically, FIG. 1 illustrates a basic structure of a time-frequency domain that is a radio resource domain in which foregoing data or a control channel is transmitted in a DL or an UL in an NR system to which an embodiment of the disclosure is applied.

In FIG. 1, a horizontal axis represents a time domain and a vertical axis represents a frequency domain. Referring to FIG. 1, a minimum transmission unit in the time domain may be an OFDM symbol, and $N_{symb}$ OFDM symbols 1-02 may be gathered to constitute one slot 1-06. A length of the subframe may be defined as 1.0 milliseconds (ms), and a length of a radio frame 1-14 may be defined as 10 ms. A minimum transmission unit in the frequency domain may be a subcarrier, and a bandwidth of the whole system transmission bandwidth may include a total of $N_{BW}$ subcarriers 1-04.

A basic unit of resources in the time-frequency domain may be a resource element (RE) 1-12 and may be represented by an OFDM symbol index and a subcarrier index. A resource block (RB) (or a physical resource block (PRB)) 1-08 may be defined by the $N_{symb}$ consecutive OFDM symbols 1-02 in the time domain and $N_{RB}$ consecutive subcarriers 1-10 in the frequency domain. Therefore, one RB 1-08 may include $N_{symb} \times N_{RB}$ REs 1-12. Generally, a minimum transmission unit of data may be the above-described RB unit. In the NR system, generally, $N_{symb}=14$ and $N_{RB}=12$, and $N_{BW}$ and $N_{RB}$ may be proportional to a bandwidth of the system transmission band. A data rate may be increased in proportion to the number of RBs scheduled for the terminal.

In the NR system, for a frequency division duplexing (FDD) system in which the DL and the UL are operated by being discriminated based on frequencies, the DL transmission bandwidth and the UL transmission bandwidth may differ from each other. The channel bandwidth may indicate an RF bandwidth that corresponds to a system transmission bandwidth. Table 1 and Table 2 show a part of a correspondence relationship among a system transmission bandwidth, a subcarrier spacing and a channel bandwidth defined in the NR system in a frequency band lower than 6 GHz and in a frequency band higher than 6 GHz, respectively. For example, the NR system having a channel bandwidth of 100 MHz as 30 kHz subcarrier spacing may have a transmission bandwidth of 273 RBs. In the shown tables, N/A may be a bandwidth-subcarrier combination that is not supported in the NR system.

TABLE 1

| Channel bandwidth $BW_{Channel}$ [MHz] | Sub carrier spacing | 5 MHz | 10 MHz | 20 MHz | 50 MHz | 80 MHz | 100 MHz |
|---|---|---|---|---|---|---|---|
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel bandwidth $BW_{Channel}$ [MHz] | Subcarrier spacing | 50 MHz | 100 MHz | 200 MHz | 400 MHz |
|---|---|---|---|---|---|
| Transmission bandwidth configuration $N_{RB}$ | 60 kHz | 66 | 132 | 264 | N/A |
| | 120 kHz | 32 | 66 | 132 | 264 |

In the NR system according to an embodiment of the disclosure, a frequency range may be defined separately for a frequency range1 (FR1) and frequency range2 (FR2) as below.

TABLE 3

| Frequency range designation | Corresponding frequency range |
|---|---|
| FR1 | 450 MHz-7125 MHz |
| FR2 | 24250 MHz-52600 MHz |

In the foregoing embodiment of the disclosure, ranges of FR1 and FR2 may be differently changed and applied. For example, a frequency range of FR1 may be changed from 450 megaHertz (MHz) to 6000 MHz and applied.

In the NR system, scheduling information regarding DL data or UL data may be delivered from the base station to the UE through DCI. The DCI may be defined according to various formats, each of which may indicate whether the DCI is scheduling information (UL grant) regarding UL data, is scheduling information (DL grant) regarding DL data, or is compact DCI having small-size control information, applies spatial multiplexing using multiple antennas, and is DCI for power control. For example, DCI format 1-1, which is scheduling control information (DL grant) regarding DL data, may include one of the following control information.

Carrier Indicator: indicates a frequency carrier in which a signal is transmitted.

DCI Format Indicator: indicates whether a DCI is for a DL or an UL.

Bandwidth Part (BWP) Indicator: indicates a BWP in which a signal is transmitted.

Frequency Domain Resource Assignment: indicates an RB of a frequency domain allocated for data transmission. A resource to be expressed may be determined based on a system bandwidth and a resource assignment scheme.

Time Domain Resource Assignment: indicates an OFDM symbol of a slot in which a data-related channel is to be transmitted.

VRB-to-PRB Mapping: indicates a scheme to map a virtual RB (VRB) with a physical RB (PRB).

Modulation and Coding Scheme (MCS): indicates a modulation scheme and a coding rate used for data transmission. That is, this may indicate information about whether a modulation scheme is quadrature phase shift keying (QPSK), 16 quadrature amplitude modulation (16 QAM), 64 QAM, or 256 QAM, and a coding rate value indicating a transport block size (TBS) and channel coding information.

Codeblock Group (CBG) transmission information: indicates information about a CBG to be transmitted when CBG retransmission is set.

HARQ Process Number: indicates a process number of HARQ.

New Data Indicator: indicates whether transmission is HARQ initial transmission or retransmission.

Redundancy version: indicates a redundancy version of HARQ.

Transmit Power Control (TPC) command for Physical Uplink Control Channel (PUCCH): indicates a TPC command for a PUCCH that is a UL control channel.

For PUSCH transmission, time domain resource assignment may be transferred through information regarding a slot in which the PUSCH is to be transmitted, a start symbol position S in the slot, and a symbol number L that is the number of symbols to which the PUSCH is mapped. Herein, S may be a relative position from the start of the slot, L may be the number of consecutive symbols, and S and L may be determined from a start and length indicator value (SLIV) defined as below.

```
if (L − 1) ≤ 7 then
    SLIV = 14 · (L − 1) + S
else
    SLIV = 14 · (14 − L + 1) + (14 − 1 − S)
where 0 < L ≤ 14 − S
```

In the NR system according to an embodiment of the disclosure, a table including an SLIV value, a PDSCH mapping type, a PUSCH mapping type, and information about a slot in which a PDSCH and a PUSCH are to be transmitted in one row may be generally configured through RRC configuration. In the time domain resource assignment of the DCI, by indicating an index value of the above-described configured table, the base station may transfer an SLIV value, a PDSCH mapping type, a PUSCH mapping type, and information about a slot in which a PDSCH and a PUSCH are to be transmitted to a terminal.

In the NR system according to an embodiment of the disclosure, the PUSCH mapping type may be defined as a type A and a type B. In the PUSCH mapping type A, the first symbol among demodulation reference signal (DMRS) symbols may be located in a second or third OFDM symbol of the slot. In the PUSCH mapping type B, the first symbol among the DMRS symbols may be located in a first OFDM symbol of a time domain resource assigned for PUSCH transmission.

In the NR system according to an embodiment of the disclosure, the PDSCH mapping type may be defined as a type A and a type B. In this case, the first symbol of DMRS symbols may be located in the first symbol of the PDSCH.

[Table 4] and [Table 5] may show combinations of S and L supported for each type of a PDSCH and a PUSCH.

TABLE 4

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Position = 3

TABLE 5

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

The DCI may be transmitted on a physical downlink control channel (PDCCH or control information, hereinafter used interchangeably) through channel coding and modulation.

Generally, the DCI may be scrambled by a particular radio network temporary identifier (RNTI, or a terminal identifier) independently for each terminal, and a cyclic redundancy check (CRC) is added to the DCI which is then channel-coded and independently configured in a PDCCH for transmission. The PDCCH may be transmitted after the PDCCH is mapped in a control resource set (CORESET) configured in the terminal.

The DL data may be transmitted on a PDSCH that is a physical channel for DL data transmission. The PDSCH may be transmitted after a control channel transmission period, and scheduling information such as a detailed mapping position, a modulation scheme, etc., in the frequency domain may be determined based on the DCI transmitted through the PDCCH.

Through the MCS among the control information of the DCI, the base station may notify the UE of a modulation scheme applied to the PDSCH to be transmitted and a size of data to be transmitted, a transport block size (TBS). The MCS according to an embodiment of the disclosure may include 5 bits or more or less. In an embodiment of the disclosure, the TBS may correspond to the size before a channel coding for error correction is applied to the data, that is, a transport block (TB), which the base station intends to transmit.

In the current embodiment of the disclosure, the TB may include a MAC header, a MAC CE, one or more MAC service data units (SDUs), padding bits, etc. In another example, the TB may indicate the unit of data transmitted down to the physical layer from the MAC layer, or a MAC protocol data unit (PDU).

A modulation scheme supported in the NR system according to an embodiment of the disclosure may be QPSK, 16 QAM, 64 QAM, and 256 QAM, and respective modulation orders Qm may correspond to 2, 4, 6, and 8. For QPSK modulation, 2 bits per symbol may be transmitted, and for 16 QAM, 4 bits per symbol may be transmitted. Further, 6 bits per symbol may be transmitted for 64 QAM, and 8 bits per symbol may be transmitted for 256 QAM.

Figure 2:
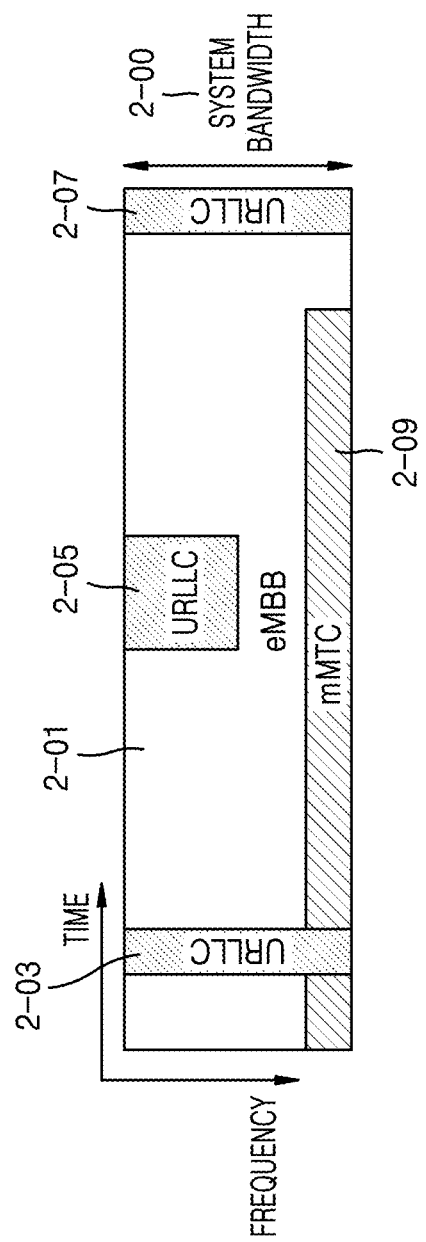
FIG. 2 illustrates a diagram for describing a state in which enhanced mobile broadband (eMBB), ultra reliable low latency communication (URLLC), and massive machine type communication (mMTC) data are allocated in an entire system frequency band, according to an embodiment of the disclosure.
Figure 3:
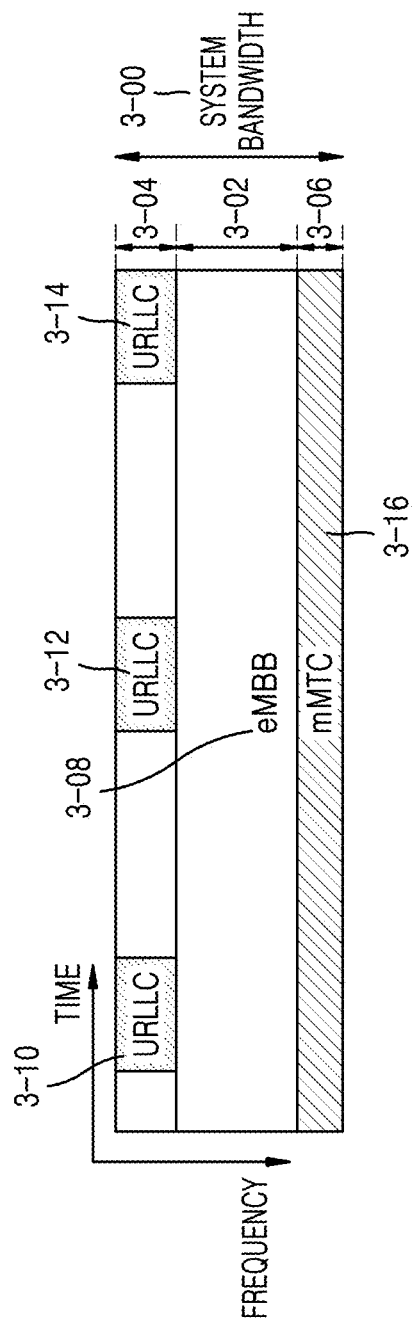
FIG. 3 illustrates a diagram for describing a method of transmitting a service and data in each sub-band into which the entire system frequency band is divided, according to an embodiment of the disclosure.

FIGS. 2 and 3 are diagrams for describing a state where data for services considered in a 5G or NR system, such as eMBB, URLLC, and mMTC, is assigned in frequency-time resources, according to an embodiment of the disclosure.

Referring to FIGS. 2 and 3, a scheme will be described in which frequency and time resources are assigned for information transmission in each system.

FIG. 2 illustrates a diagram for describing a state in which enhanced mobile broadband (eMBB), ultra reliable low latency communications (URLLC), and massive machine type communications (mMTC) data are allocated in an entire system frequency band, according to an embodiment of the disclosure. Referring to FIG. 2, when URLLC data 2-03, 2-05, and 2-07 are generated and thus need to be transmitted during assignment and transmission of eMBB 2-01 and mMTC 2-09 in a particular frequency band, the terminal or the base station may empty parts with which the eMBB 2-01 and the mMTC 2-09 are already assigned or transmit the URLLC data 2-03, 2-05, and 2-07 without transmission of the parts. The URLLC data 2-03, 2-05, and 2-07 may be assigned to a part of a resource assigned with the eMBB 2-01 and transmitted because a delay time of the URLLC among the aforementioned services needs to be reduced. When the URLLC data 2-03, 2-05, and 2-07 are additionally assigned to and transmitted in a resource to which the eMBB data 2-01 is already assigned, eMBB data may not be transmitted in the redundant frequency-time resources, such that transmission performance for the eMBB data may be degraded. That is, in this case, an eMBB data transmission failure due to assignment of the URLLC data may occur.

FIG. 3 illustrates a diagram for describing a method of transmitting a service and data in each sub-band into which the entire system frequency band is divided, according to an embodiment of the disclosure. Sub-band configuration-related information according to an embodiment of the disclosure may be previously determined, and the sub-band configuration-related information may be transmitted from a base station to a UE through higher layer signaling. In another example, sub-band-related information may be arbitrarily divided by the base station or a network node, such that services may be provided to the UE without separate transmission of sub-band configuration-related information. In FIG. 3, as an example, a sub-band 3-02 may be assumed to be used for transmission of eMBB data 3-08, a sub-band 3-04 may be assumed to be used for transmission of URLLC data 3-10, 3-12, and 3-14, and a sub-band 3-06 may be assumed to be used for transmission of mMTC data 3-16.

Throughout the disclosure, a length of a transmission time interval (TTI) used for URLLC data transmission may be shorter than a length of a TTI used for eMBB data transmission or mMTC data transmission. A response to information related to URLLC data may be transmitted faster than eMBB data or mMTC data, such that information may be transmitted and received with low latency. A structure of a physical channel used for each type to transmit the foregoing three types of services or data may differ. For example, at least one of a length of a TTI, an assignment unit of a frequency resource, a structure of a control channel, or a mapping method of data may be different.

While three types of services and three types of data have been assumed for a description in the foregoing embodiments of the disclosure, it would be sufficiently understood by those of ordinary skill in the art that more types of services and corresponding data may exist and the disclosure is applicable to this case.

To describe a method and apparatus proposed in the disclosure, the terms, physical channel and signal, in the NR system may be used. However, the disclosure may be applied to other wireless communication systems as well as the NR system.

Figure 4:
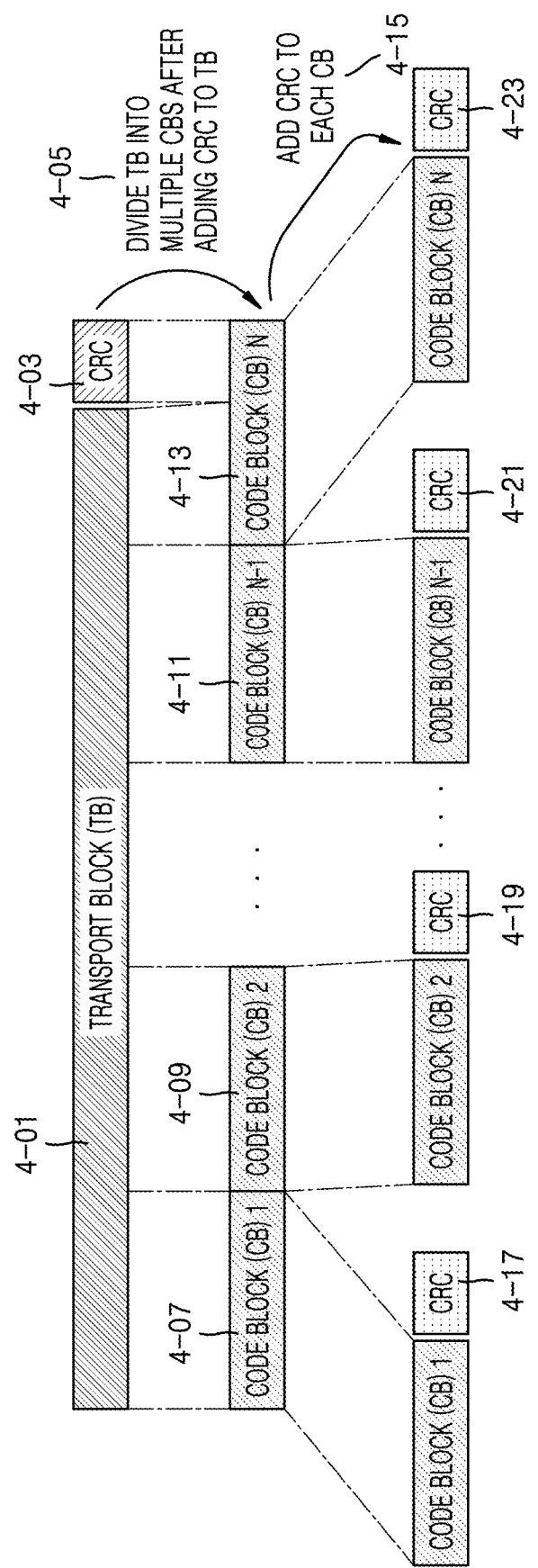
FIG. 4 illustrates a diagram for describing a process in which one transport block is divided into several code blocks and a cyclic redundancy check (CRC) is added.

FIG. 4 illustrates a diagram for describing a process in which one transport block is divided into several code blocks and a CRC is added.

Referring to FIG. 4, a CRC 4-03 may be added to an end part or a start part of a TB 4-01 to be transmitted in an UL or DL. The CRC 4-03 may have 16 or 24 bits or a pre-fixed bit number, or may have a bit number variable with a channel condition, etc., and may be used to determine a channel coding success.

In operation 4-05, the blocks 4-01 and 4-03 in which the CRC is added to the TB may be divided into several code blocks (CBs) 4-07, 4-09, 4-11, and 4-13. A maximum size for the CB may be previously defined, and in this case, the last CB 4-13 may be smaller in size than the other CBs or may be padded with 0, a random value, or 1 to have the same length as the other CBs.

In operation 4-15, CRCs 4-17, 4-19, 4-21, and 4-23 may be added to each of the CBs. The CRC may have 16 or 24 bits or a pre-fixed bit number, and may be used to determine a channel coding success.

The TB 4-01 and a cyclic generator polynomial may be used to generate the foregoing CRC 4-03, and the cyclic generator polynomial may be defined in various manners. For example, assuming that a cyclic generator polynomial for a 24-bit CRC is $g_{CRC24A}(D)=[D^{24}+D^{23}+D^{18}+D^{17}+D^{14}+D^{11}+D^{10}+D^7+D^6+D^5+D^4+D^3+D+1]|$ and L=24, for TB data $a_0, a_1, a_2, a_3, \ldots, a_{A-1}$, the CRC $p_0, p_1, p_2, p_3, \ldots, p_{L-1}$ may be determined to be a value $p_0, p_1, p_2, p_3, \ldots, p_{L-1}$ having a remainder of 0 after dividing $a_0 D^{A+23}+a_1 D^{A+22}+\ldots+a_{A-A}D^{24}+p_0 D^{23}+p_1 D^{22}+\ldots+p_{22}D^1+p_{23}$ by $g_{CRC24A}(D)$. Although a CRC length L is 24 as an example in the foregoing embodiment of the disclosure, the foregoing length may be determined to be various lengths such as 12, 16, 24, 32, 40, 48, 64, etc.

As described above, in operation 4-05, a transmitter may add a CRC to a TB in the foregoing process and then divide the TB into N CBs 4-07, 4-09, 4-11, and 4-13. In operation 4-15, the CRCs 4-17, 4-19, 4-21, and 4-23 may be added to each of the divided CBs 4-07, 4-09, 4-11, and 4-13. To generate the CRC added to the CB, a CRC having a length that is different from one used to generate the CRC added to the TB or a different cyclic generator polynomial may be used. However, the CRC 4-03 added to the foregoing TB and the CRCs 4-17, 4-19, 4-21, and 4-23 added to the CBs may be omitted according to a type of a channel code to be applied to a corresponding CB. For example, when a low-density parity-check (LDPC) code rather than a turbo code is applied to a CB, the CRCs 4-17, 4-19, 4-21, and 4-23 to be inserted for the respective CBs may be omitted. However, even when LDPC is applied, the CRCs 4-17, 4-19, 4-21, and 4-23 may be added to the respective CBs. In addition, when a polar code is used, a CRC may be added or omitted.

As described with reference to FIG. 4, in a TB to be transmitted, a maximum length of one CB may be determined based on a type of channel coding to be applied. Division of a TB and a CRC to be added to the TB into CBs may be performed based on a maximum length of a CB.

Meanwhile, in an existing LTE system, a CB-specific CRC is added to a CB, and data bits of the CB and the CRC are encoded into a channel code to determine coded bits, in which for the respective coded bits, a rate-matching bit number is determined as previously agreed.

Figure 5:
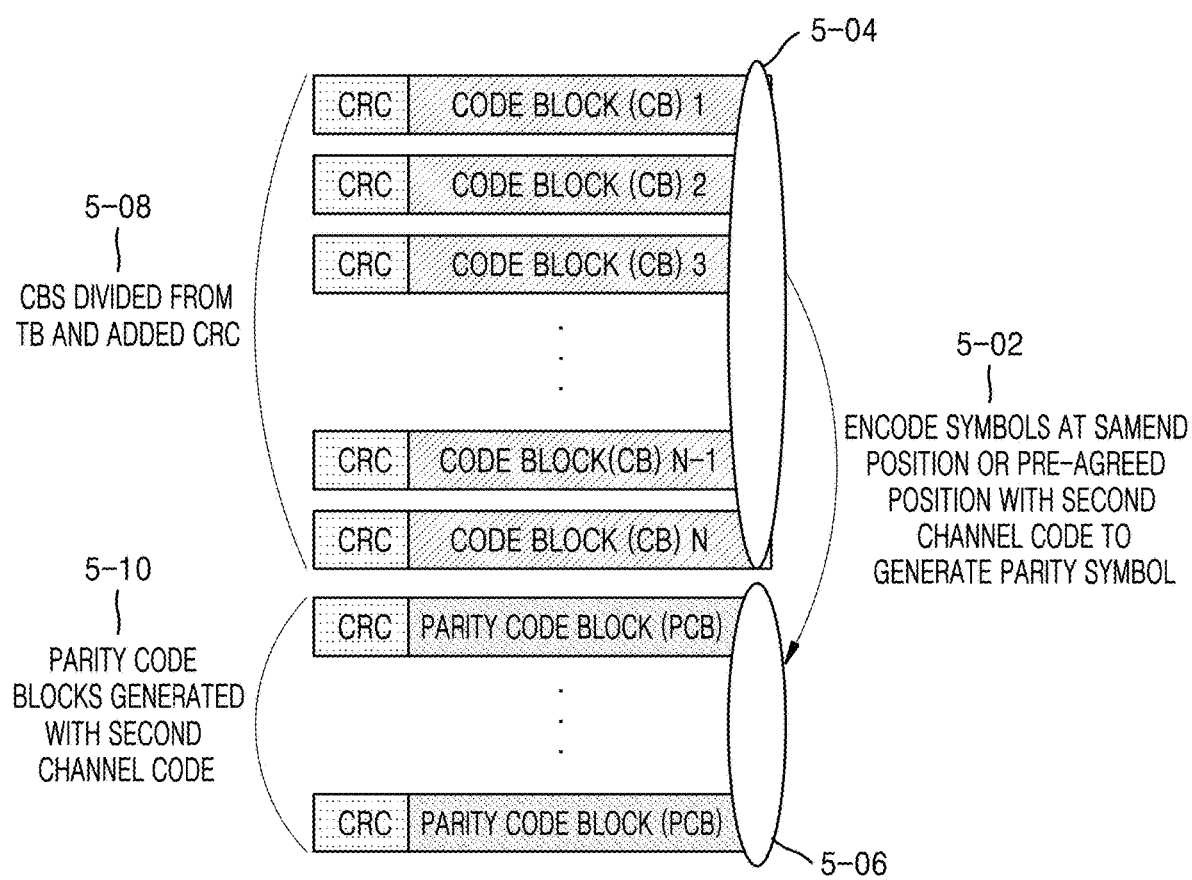
FIG. 5 illustrates a diagram for describing a transmission scheme using an outer code, according to an embodiment of the disclosure.
Figure 6A:
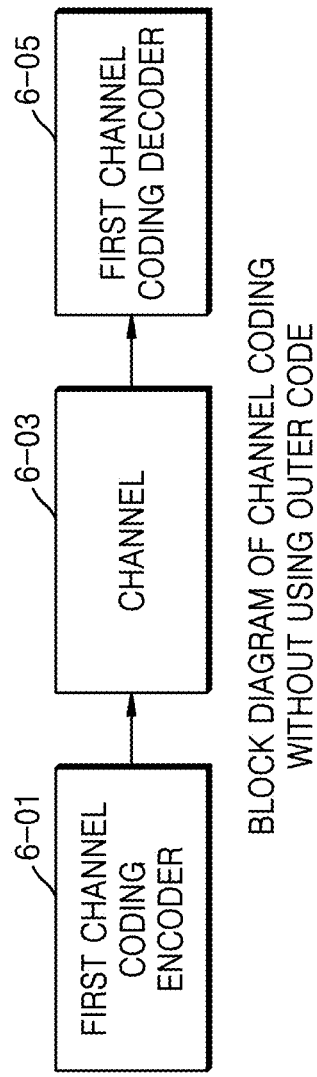
FIGS. 6A-6B illustrate block diagrams for describing a structure of a communication system in which an outer code is used, according to an embodiment of the disclosure.
Figure 6B:
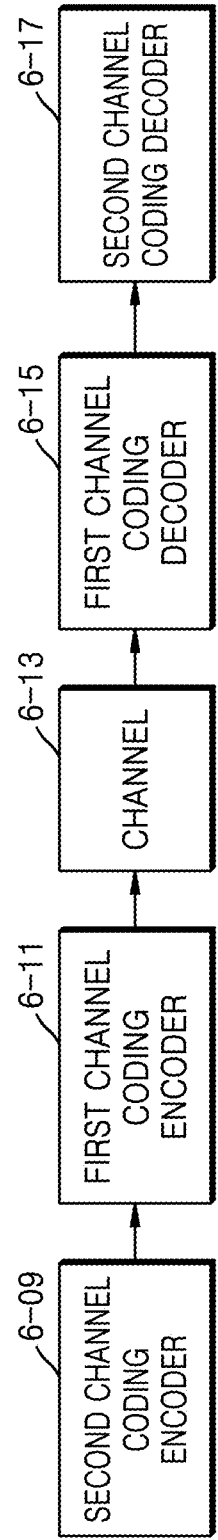

FIG. 5 illustrates a diagram for describing a transmission scheme using an outer code, according to an embodiment of the disclosure. FIGS. 6A-6B illustrate block diagrams for describing a structure of a communication system in which an outer code is used, according to an embodiment of the disclosure. Referring to FIGS. 5, 6A, and 6B, a method of transmitting a signal using an outer code will be described.

Referring to FIG. 5, in operation 5-02, after one TB is divided into several CBs, bits or symbols 5-04 located at the same position in each CB may be encoded to a second channel code, thus generating parity bits or symbols 5-06. Thereafter, CRCs 5-08 and 5-10 may be added to respective CBs and parity CBs generated with second channel code encoding.

Whether to add a CRC may be determined depending on a type of a channel code. For example, when a turbo code is used as a first channel code, the CRCs 5-08 and 5-10 may be added, but respective CBs and parity code blocks may be encoded by first channel code encoding. In the disclosure, as the first channel code, a convolutional code, an LDPC code, a turbo code, a polar code, etc., may be used. However, this is merely an example, and various channel codes may be applied to the disclosure as the first channel code. In the disclosure, as the second channel code, a Reed-Solomon code, a BCH code, a raptor code, a parity bit generation code, etc., may be used. However, this is merely an example, and various channel codes may be applied to the disclosure as the second channel code.

FIGS. 6A-6B illustrate block diagrams for describing a structure of a communication system in which an outer code is used, according to an embodiment of the disclosure. Referring to FIG. 6A, when an outer code is not used, a first channel coding encoder 6-01 and a first channel coding decoder 6-05 may be used in a transceiver, and a second channel coding encoder and a second channel coding decoder may not be used. Meanwhile, when the outer code is not used, the first channel coding encoder 6-01 and the first channel coding decoder 6-05 may be configured identically to a case where the outer code to be described later is used.

Referring to FIG. 6B, when the outer code is used, data to be transmitted may pass through a second channel coding encoder 6-09. Bits or symbols passing through the second channel coding encoder 6-09 may pass through a first channel coding encoder 6-11. When channel-coded symbols are received in a receiver after passing through a channel 6-13, the receiver may sequentially operate a first channel coding decoder 6-15 and a second channel coding decoder 6-17 based on a received signal. The first channel coding decoder 6-15 and the second channel coding decoder 6-17 may perform operations corresponding to the first channel coding encoder 6-11 and the second channel coding encoder 6-09.

Figure 7:
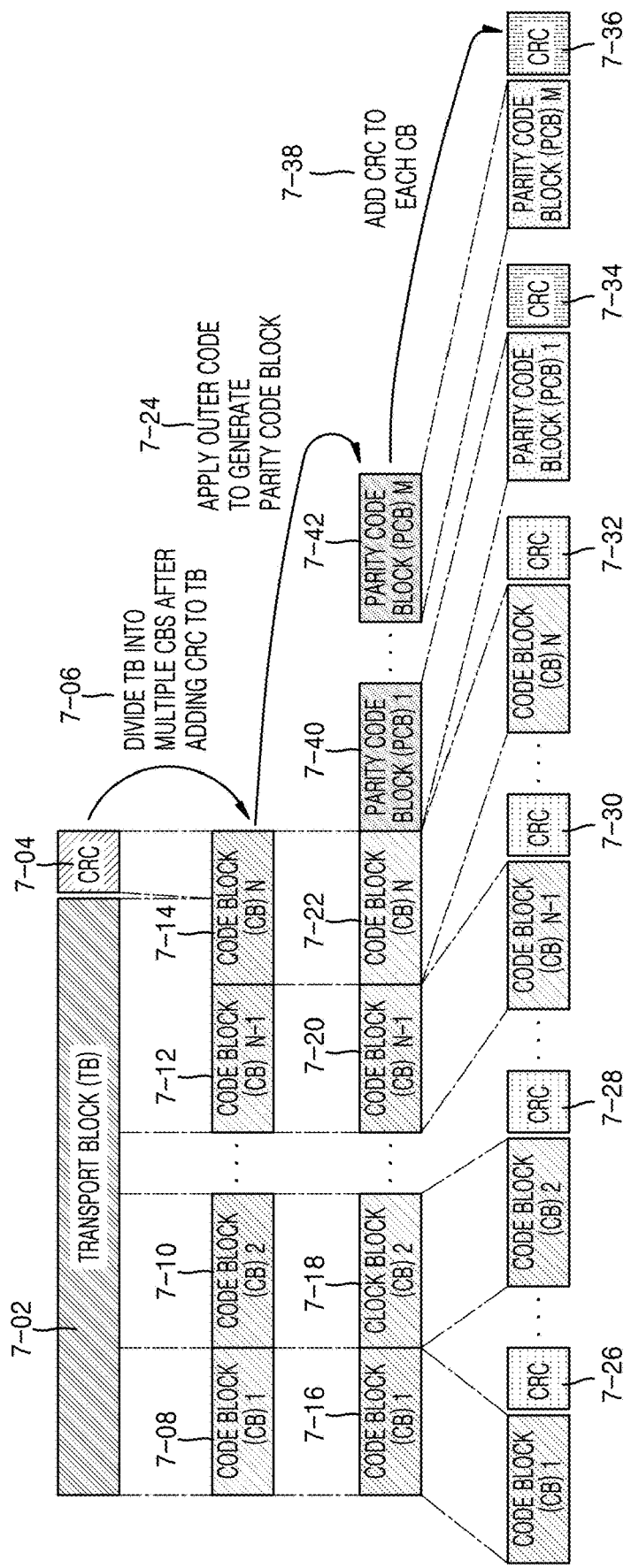
FIG. 7 illustrates a diagram for describing a method of generating a parity code block for a transport block, according to an embodiment of the disclosure.

FIG. 7 illustrates a diagram for describing a method of generating a parity code block for a transport block, according to an embodiment of the disclosure. More specifically, FIG. 7 illustrates a diagram for describing a method of generating one or more parity code blocks by applying a second channel code or an outer code to several CBs divided from one TB, according to an embodiment of the disclosure.

As described with reference to FIG. 4, one TB may be divided into one or more CBs. In this case, when one CB is generated based on a size of TB, a CRC may not be added to the CB. When an outer code is applied to CBs to be transmitted, parity CBs 7-40 and 7-42 may be generated as described with reference to operation 7-24. When the outer code is used, the parity code blocks 7-40 and 7-42 may be located at the rear of the last CB.

In operation 7-38, after the outer code, CRCs 7-26, 7-28, 7-30, 7-32, 7-34, and 7-36 may be added. Thereafter, each CB and each parity CB may be encoded with a channel code together with a CRC.

In an NR system, a size of a TB may be calculated through steps described below.

Step 1: The number of REs assigned to PDSCH mapping in one PRB in an assignment resource, $N'_{RRE}$, may be calculated.

$N'_{RE}$, may be calculated as $N'_{RE}=N_{sc}^{RB} \cdot N_{symb}^{sh} - N_{DMRS}^{PRB} - N_{oh}^{PRB}$. Herein, $N_{sc}^{RB}$ may be 12, and $N_{symb}^{oh}$ may indicate the number of OFDM symbols assigned to a PDSCH. $N_{DMRS}^{PRB}$ indicates the number of REs, occupied by a DMRS of an identical CDM group, in one PRB. $N_{oh}^{PRB}$ indicates the number of REs, occupied by overhead, in one PRB configured by higher layer signaling, and may be set to one of 0, 6, 12, and 18. Thereafter, the number of REs assigned to a PDSCH, $N_{RE}$, may be calculated. $N_{RE}$ may be calculated as $N_{RE}=\min(156, N'_{RE}) \cdot n_{PRB}$, and $n_{PRB}$ may indicate the number of PRBs assigned to a terminal.

Step 2: The number of random information bits, $N_{info}$, may be calculated as $N_{info}=N_{Re} \cdot R \cdot Q_m^v$. Herein, R may indicate a code rate, and Qm may indicate a modulation order and information of this value may be transferred using a table that is pre-agreed with an MCS bit field in control information. In addition, v may indicate the number of assigned layers. In case of $N_{info} \leq 3824$, a TBS may be calculated through Step 3. The TBS may also be calculated through Step 4.

Step 3: $N'_{info}$ may be calculated through Equation of $$N'_{info} = \max\left(24, 2^n \cdot \left\lfloor \frac{N_{info}}{2^n} \right\rfloor\right)$$

and $n=\max(3, \lfloor \log_2(N_{info}) \rfloor - 6)$. The TBS may be determined as a value that is closest to $N'_{info}$ among values that are not less than $N'_{info}$ in [Table 6].

TABLE 6

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |

TABLE 6-continued

| Index | TBS |
|---|---|
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N'_{info}$ may be calculated through Equation of $$N'_{info} = \max\left(3840, 2^n \times \text{round}\left(\frac{N_{info} - 24}{2^n}\right)\right)$$

and $n = \lfloor \log_2(N_{info} - 24) \rfloor - 5$. The TBS may be determined through $N'_{info}$ value and [pseudo-code 1].

[Pseudo-code 1 Start ]
if R≤1/4

$$TBS = 8 * C * \left\lceil \frac{N'_{info} + 24}{8 * C} \right\rceil - 24, \text{ where } C = \left\lceil \frac{N'_{info} + 24}{3816} \right\rceil$$

else
  if $N_{info}$' > 8424

$$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if
end if
[Pseudo-code 1 End]

In the NR system, when one CB is input to an LDPC encoder, parity bits may be added and output. In this case, the amount of parity bits may vary with an LDCP base graph. For a particular input, a method of transmitting all parity bits generated by LDPC coding may be referred to as full buffer rate matching (FBRM). A method of limiting the number of transmittable parity bits may be referred to as limited buffer rate matching (LBRM). When a resource is assigned for data transmission, an LDPC encoder output is generated into a circular buffer and generated buffer bits may be transmitted repeatedly as many times as assigned resources. In this case, a length of a circular buffer may be referred to as $N_{cb}$. Let the number of all parity bits generated by LDPC coding be N, then $N_{cb}=N$ in the FBRM method. Meanwhile, in an LBRM method, $N_{cb}=\min(N, N_{ref})$, $N_{ref}$ may be given as $$N_{ref} = \left\lfloor \frac{TBS_{LBRM}}{C \cdot R_{LBRM}} \right\rfloor,$$

and $R_{LBRM}$ may be determined as 2/3. In the foregoing method of obtaining a TBS, $TBS_{LBRM}$ may indicate the maximum number of layers supported in a terminal in a cell. In this case, it may be assumed that a maximum modulation order is set to a terminal in a cell or a maximum modulation order is 64QAM when the maximum modulation order is not set to the terminal, a code rate is 948/1024 that is a maximum code rate, $N_{RE}$ is $N_{RE}=156 \cdot n_{PRB}$, and $n_{PRB}$ is $n_{PRB}=n_{PRB,LBRM}$, and a corresponding value may be given as shown in Table 7.

TABLE 7

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the NR system, a maximum data rate supported by the terminal may be determined through [Equation 1].

[Equation 1]

data rate (in Mbps) =

$$10^{-6} \cdot \sum_{j=1}^{J}\left(v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)})\right)$$

In Equation 1, J may indicate the number of carriers grouped by carrier aggregation, Rmax=948/1024, $v_{Layers}^{(j)}$ may indicate a maximum number of layers, $Q_m^{(j)}$ may indicate a maximum modulation order, $f^{(j)}$ may indicate a scaling coefficient, and μ may indicate a subcarrier interval. $f^{(j)}$ one of 1, 0.8, 0.75, and 0.4 may be reported by a terminal, and μ may be given as Table 8 provided below.

TABLE 8

| $f^{(j)}$ | $v_{Layers}^{(j)}$ | $Q_m^{(j)}$ | Rmax | $N_{PRB}^{BW(j)\cdot\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

$T_s^\mu$ may indicate an average OFDM symbol length, $T_s^\mu$ may be calculated as $$T_s^\mu = \frac{10^{-3}}{14 \cdot 2^\mu},$$

may indicate a maximum RB number in a $BW^{(j)}$. $OH^{(j)}$, an overhead value, may be given as 0.14 in a DL and as 0.18 in an UL in FR1 (a band less than or equal to 6 GHz), and as 0.08 in a DL and as 0.10 in an UL in FR2 (a band over 6 GHz). Based on Equation 1, in a cell having a frequency bandwidth of 100 MHz in a subcarrier interval of 30 kHz, a maximum data rate in a DL may be calculated as shown in Table 9.

TABLE 9

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate measured in actual data transmission of the terminal may be a result of dividing the amount of data by a data transmission time. This may be a value of dividing a TBS for transmission of one TB or a TBS sum for transmission of two TBs by a TTI length. For example, like an assumption for Table 5, in a cell having a frequency bandwidth of 100 MHz in a subcarrier interval of 30 kHz, a maximum data rate in a DL may be determined as shown in Table 10 based on the number of assigned PDSCH symbols.

TABLE 10

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

A maximum data rate supported by the terminal may be identified from Table 9, and an actual data rate corresponding to an assigned TBS may be identified from Table 10. In this case, the actual data rate may be greater than the maximum data rate based on scheduling information.

In a wireless communication system, especially, an NR system, a data rate supportable by the terminal may be agreed between the base station and the terminal. The data rate may be calculated by using a maximum frequency band, a maximum modulation order, the maximum number of layers, etc., supported by the terminal. However, the calculated data rate may be different from a value calculated from a TB size (TBS) and a TTI length used for actual data transmission.

Thus, the terminal may be assigned with a TBS larger than a value corresponding to a data rate supported by the terminal, and to prevent this, a TBS that may be scheduled may be restricted according to a data rate supported by the terminal.

UL control information (UCI) that may include at least one of an HARQ-ACK feedback, a channel state report, or a scheduling request may be transmitted in a PUCCH or a PUSCH. The PUCCH may be transmitted in a resource previously configured by higher layer signaling or/and indicated in DCI. For example, the base station may configure one PUCCH resource set or a plurality of PUCCH resource sets for the terminal through higher layer signaling. Each PUCCH resource set may include one PUCCH resource or a plurality of PUCCH resources, each of which may be configured for a particular PUCCH format. Each PUCCH resource may include time resource information such as a start symbol position and the number of mapped symbols in one symbol and frequency resource information including a start PRB position, the number of mapped PRBs, frequency hopping, frequency domain information in frequency hopping, etc. The PUCCH resource may also include precoding information such as cyclic shift, orthogonal cover code (OCC) information, and discrete Fourier transform. In practice, a PUCCH resource domain transmitted by the terminal may be indicated in a bit field such as a PUCCH resource indicator (PRI) of DCI. The value indicated in the foregoing bit field may be information indicating one of a PUCCH resource set and PUCCH resources configured by higher layer signaling.

The terminal may report information about its capability to the base station while connecting to the base station. The above-described capability may include parameters (e.g., the maximum number of layers, a maximum modulation order, a maximum frequency bandwidth, support of a particular technology, etc.) supportable by the terminal, and the terminal may report the above-described information to the base station. To this end, the base station may indicate providing of the information about the capability to the terminal by transmitting a UE capability enquiry message, and the terminal may provide the information about the capability by transmitting a UE capability information message. The information about the capability of the terminal may be transferred to the base station through higher layer signaling such as RRC signaling, etc. The base station or a separate server may store the information about the capability of a particular terminal. The information about the capability of the terminal, which is stored in the base station or the separate server, may be used for the base station to immediately recognize the capability of the terminal when the terminal accesses the same base station next.

The UE capability information may include information about minimum time information required for the terminal to receive the PDSCH and transmit the HARQ-ACK feedback thereto to the base station, and the minimum time information may be referred to as a minimum processing time. The UE capability information may also include information about minimum time information required for the terminal to receive UL scheduling from the base station and transmit the PUSCH. The base station may indicate an HARQ-ACK feedback timing and a PUSCH transmission timing to the terminal based on the above-described UE capability information about a processing time. That is, the base station may indicate the above-described timing information to the terminal through a value greater than the minimum processing time.

According to an embodiment of the disclosure, in the 5G or NR system, when the base station transmits the PDSCH including the DL data, the base station may indicate a value $K_1$ corresponding to timing information regarding a timing at which the terminal transmits HARQ-ACK information of the PDSCH, in the DCI for scheduling the PDSCH. When the HARQ-ACK information includes a timing advance and is not indicated to be transmitted prior to a symbol $L_1$, the terminal may transmit HARQ-ACK information to the base station. That is, the HARQ-ACK information may include a timing advance and may be transmitted at a timing coinciding with or following the symbol L1 from the terminal to the base station. When the HARQ-ACK information includes a timing advance and is indicated to be transmitted prior to the symbol $L_1$, the HARQ-ACK information may not be valid HARQ-ACK information in HARQ-ACK transmission from the terminal to the base station. The symbol $L_1$ may be the first symbol in which a CP starts after $T_{proc,1}$ from the last timing of the PDSCH. $T_{proc,1}$ may be calculated as in Equation 2.

$$T_{proc,1} = ((N_1 + d_{1,1} + d_{1,2})(2048 + 144) \cdot \kappa 2^{-\mu}) \cdot T_C | \quad \text{[Equation 2]}$$

In Equation 2, $N_1$, $d_{1,1}$, $d_{1,2}$, $\kappa\mu$, and $T_C$ may be defined as below.
- When the HARQ-ACK is transmitted through a PUCCH (UL control channel), it is likely that $d_{1,1}=0$; when the HARQ-ACK is transmitted through a PUSCH (UL shared channel, data channel), it is likely that $d_{1,1}=1$.
- When a plurality of activated configuration carriers or carriers are configured in the terminal, a maximum timing difference between carriers may be reflected to transmission of the second signal.
- For a PDSCH mapping type A, that is, when the first DMRS symbol position is the third or fourth symbol of the slot, $d_{1,2}=7-i$ in case that a position index i of the last OFDM symbol of the PDSCH is less than 7.
- For a PDSCH mapping type B, that is, when the first DMRS symbol position is the first symbol of the PDSCH, $d_{1,2}=3$ in case that a length of the PDSCH is 4 symbols; when the length of the PDSCH is 2 symbols, then $d_{1,2}=3+d$ where d indicates the number of symbols in which PDSCH and the PDCCH including a control signal for scheduling the PDSCH overlap with each other.
- $N_1$ may be defined by μ as in Table 11. μ=0, 1, 2, and 3 may mean subcarrier spacings 15 kHz, 30 kHz, 60 kHz, and 120 kHz, respectively.

TABLE 11

| | PDSCH decoding time $N_1$ [symbols] | |
| --- | --- | --- |
| μ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

For $N_1$ provided in Table 11, a different value may be used depending on UE capability.

$T_C = 1/(\Delta f_{max} \cdot N_f)$, $\Delta f_{max} = 480 \cdot 10^3$ Hz, $N_f = 4096$, $\kappa = T_S/T_C = 64$, $T_S = 1/(\Delta f_{ref} \cdot N_{f,ref})$, |

$\Delta f_{ref} = 15 \cdot 10^3$ Hz, $N_{f,ref} = 2048$ defined, respectively.

In the 5G or NR system according to an embodiment of the disclosure, when the base station transmits control information including UL scheduling approval, the base station may indicate a value $K_2$ corresponding to timing information regarding a timing at which the terminal transmits UL data or a PUSCH.

When the PUSCH includes a timing advance and is not indicated to be transmitted prior to the symbol $L_2$, the terminal may transmit the PUSCH to the base station. That is, the PUSCH may include a timing advance and may be transmitted at a timing coinciding with or following the symbol $L_2$ from the terminal to the base station. When the PUSCH includes a timing advance and is indicated to be transmitted prior to the symbol $L_2$, the terminal may ignore UL scheduling approval control information coming from the base station. The symbol $L_2$ may be the first symbol in which a CP of a PUSCH symbol to be transmitted after $T_{proc,2}$ from the last timing of the PDCCH including a scheduling approval starts. $T_{proc,2}$ may be calculated as in Equation 3.

$$T_{proc,2}=((N_2+d_{2,1})(2048+144)\cdot\kappa 2^{-\mu})\cdot T_C| \quad \text{[Equation 3]}$$

In Equation 3, $N_2$, $d_{2,1}$, $\kappa\mu$, and $T_C$ may be defined as below.
- When the first symbol among PUSCH-assigned symbols may include a DMRS, $d_{2,1}=0$; otherwise, $d_{2,1}=1$.
- When a plurality of activated configuration carriers or carriers are configured in the terminal, a maximum timing difference between carriers may be reflected to transmission of the second signal.
- $N_2$ may be defined by μ as in Table 12. μ=0, 1, 2, and 3 may mean subcarrier spacings 15 kHz, 30 kHz, 60 kHz, and 120 kHz, respectively.

TABLE 12

| μ | PUSCH preparation time $N_2$ [symbols] |
|---|---|
| 0 | 10 |
| 1 | 12 |
| 2 | 23 |
| 3 | 36 |

For $N_2$ provided in Table 12, a different value may be used depending on UE capability. That is, $T_C = 1/(\Delta f_{max} \cdot N_f)$, $\Delta f_{max} = 480 \cdot 10^3$ Hz, $N_f = 4096$, $\kappa = T_s/T_c = 64$, $T_s = 1/(\Delta f_{ref} \cdot N_{f,ref})$, |

$\Delta f_{ref} = 15 \cdot 10^3$ Hz, $N_{f,ref} = 2048$ may be defined, respectively.

Meanwhile, the 5G or NR system according to an embodiment of the disclosure may set a BWP in one carrier such that a particular terminal may be designated for transmission and reception in the set BWP. This may be performed to reduce power consumption of the terminal. The base station may set a plurality of BWPs, and may change an activated BWP in control information. A time available by the terminal for change of the BWP may be defined as in Table 13.

TABLE 13

| Frequency Range | Scenario | Type 1 Delay (us) | Type 2 Delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

In Table 13, an FR1 may mean a frequency band less than or equal to 6 GHz, and an FR2 may mean a frequency band greater than or equal to 6 GHz. In the above-described embodiment of the disclosure, a type 1 and a type 2 may be determined according to UE capability. In the above-described embodiment of the disclosure, scenarios 1, 2, 3, and 4 may be given as in Table 14.

TABLE 14

|  | Center Frequency Changeable | Center Frequency Unchangeable |
|---|---|---|
| Frequency Bandwidth Changeable | Scenario 3 | Scenario 2 |
| Frequency Bandwidth Unchangeable | Scenario 1 | Scenario 4 in case of change in subcarrier spacing |

When a BWP change request exists in control information or a BWP change is triggered, it may mean that BWP information indicated by a BWP indicator is different from a currently activated BWP such that the BWP may be changed. On the other hand, when the currently activated BWP indicates the same BWP, it may mean that there is no BWP change request.

Hereinafter, embodiments of the disclosure will be described in detail with reference to the accompanying drawings. When determined to make the subject matter of the disclosure unclear, the detailed description of related functions or configurations may be skipped. Further, the terminologies to be described below are defined in consideration of functions in the disclosure and may vary depending on a user's or operator's intention or practice. Therefore, the terms should be defined based on the overall disclosure.

Hereinbelow, the base station (BS) is an entity that performs resource assignment of the terminal, and may be at least one of gNode B (gNB), eNode B (eNB), Node B, a wireless access unit, a base station controller, or a node on a network. The terminal may include a UE, an MS, a cellular phone, a smartphone, a computer, or a multimedia system capable of performing communication functions. In the disclosure, a DL may mean a wireless transmission path of a signal for transmission from the base station to the UE, and an UL may mean a wireless transmission path of a signal for transmission from the UE to the base station. While embodiments of the disclosure are described by using an NR system as an example, the embodiments of the disclosure may also be applied to other communication systems having a similar technical background or channel form. Also, the embodiments of the disclosure may also be applied to other communication systems through some modifications within a range that does not largely depart from the scope of the disclosure based on determination of a skilled person.

In the disclosure, a physical channel and a signal of the related art may be used interchangeably with data or a control signal. For example, a PDSCH is a physical channel for transmitting data, but in the disclosure, a PDSCH may be used as data.

Hereinafter, in the disclosure, high-layer signaling is a method of delivering a signal from a BS to a UE by using a DL data channel of a physical layer or from the UE to the BS by using an UL data channel of the physical layer, and may be mentioned as RRC signaling or a medium access control (MAC) control element (CE).

Meanwhile, in the disclosure, a peak data rate, a max data rate, a maximum data rate, etc., may be used interchangeably.

In a first embodiment of the disclosure, a method and apparatus for determining a resource for transmitting an UL PUCCH may be provided.

In an embodiment of the disclosure, PUCCH transmission including UL control information may be determined according to DCI transmission. The DCI may transfer resource information for PUCCH transmission. When several DCI indicate a PUCCH resource transmitted at the same timing, the terminal may need to determine which PUCCH resource transmit UL control information. Determination of the PUCCH resource may be provided basically in the following manner.

For a PUCCH transmission with HARQ-ACK information, a UE determines a PUCCH resource after determining a set of PUCCH resources for $O_{UCI}$ HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 that have a value of a PDSCH-to-HARQ feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes.

The PUCCH resource indicator field values map to values of a set of PUCCH resource indexes, as defined in Table 9.2.3-2, provided by ResourceList for PUCCH resources from a set of PUCCH resources provided by PUCCH-ResourceSet with a maximum of eight PUCCH resources.

The above-described method is a method in which when DCI related to PUCCHs transmitted at the same timing is detected, the DCI is arranged (or indexed) first based on serving cell indexes, then arranged based on PDCCH monitoring occasions (timings), and then uses a PUCCH resource indicated by the last DCI.

Figure 8:
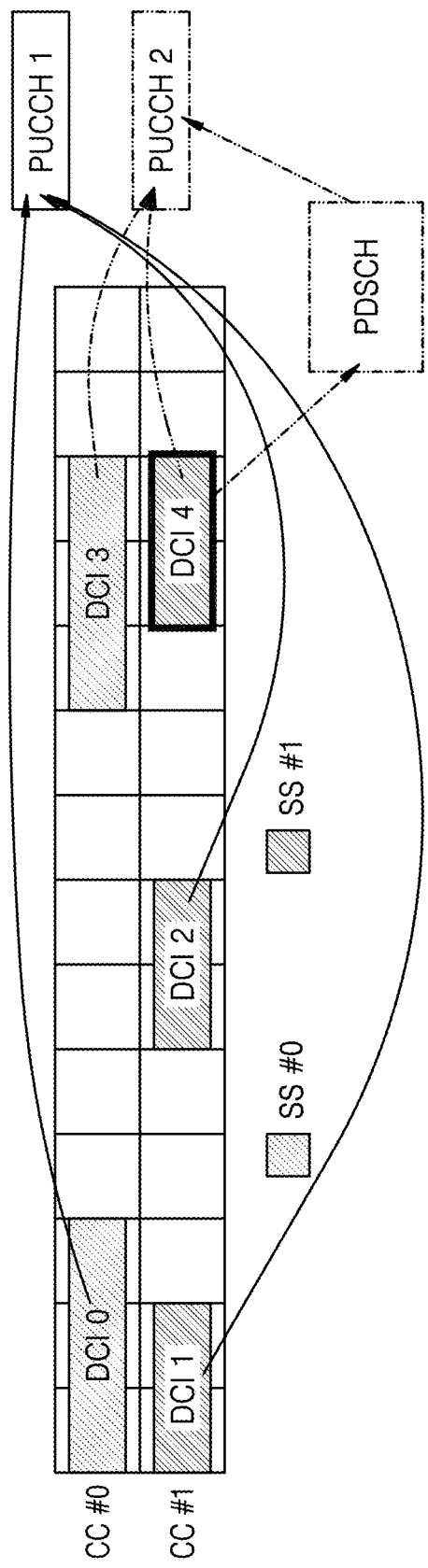
FIG. 8 illustrates a diagram for describing a method of determining a physical uplink control channel (PUCCH) resource, according to an embodiment of the disclosure.

FIG. 8 illustrates a diagram for describing a method of determining a PUCCH resource, according to an embodiment of the disclosure. Referring to FIG. 8, a description will be made of a method for determining a PUCCH resource that is to be actually transmitted when PUCCHs in which HARQ-ACK information regarding PDSCH or SPS (semi-persistent scheduling) scheduling related information scheduled by 5 DCI is transmitted are PUCCHs to be transmitted at the same timing.

According to the method of FIG. 8, when DCI related to PUCCHs transmitted at the same timing is detected, the DCI may be first arranged (or indexed) based on serving cell indexes. Next, the DCI may be arranged based on a PDCCH monitoring occasion and thus may be arranged in an order of DCI 0, DCI 1, DCI 2, DCI 3, and DCI 4. UL control information related to DCI 0, DCI 1, DCI 2, DCI 3, and DCI 4 may be transmitted in PUCCH 2 indicated by the last DCI, DCI 4 according to a defined method.

However, clear understanding may be required between the base station and the terminal, in the following part:

How to determine a PDCCH monitoring occasion order;

How to deal with a case where a sufficient processing time is not secured after reception of the last DCI;

A network according to an embodiment of the disclosure may provide a PDCCH monitoring resource configuration to the terminal through PDCCH-Config, a ControlResourceSet information element (IE), a SearchSpace IE, etc. The network may set a length of CORESET to a length of one through three symbols through a parameter like a duration in the ControlResourceSet IE. In addition, particular CORESET may be associated with SearchSpace through a controlResourceSetId parameter in the SearchSpace IE, and a position on a time axis may be set through a parameter such as monitoringSlotPeriodicityAndOffset, duration, and monitoringSymbolsWithinSlot in the SearchSpace IE.

Figure 9:
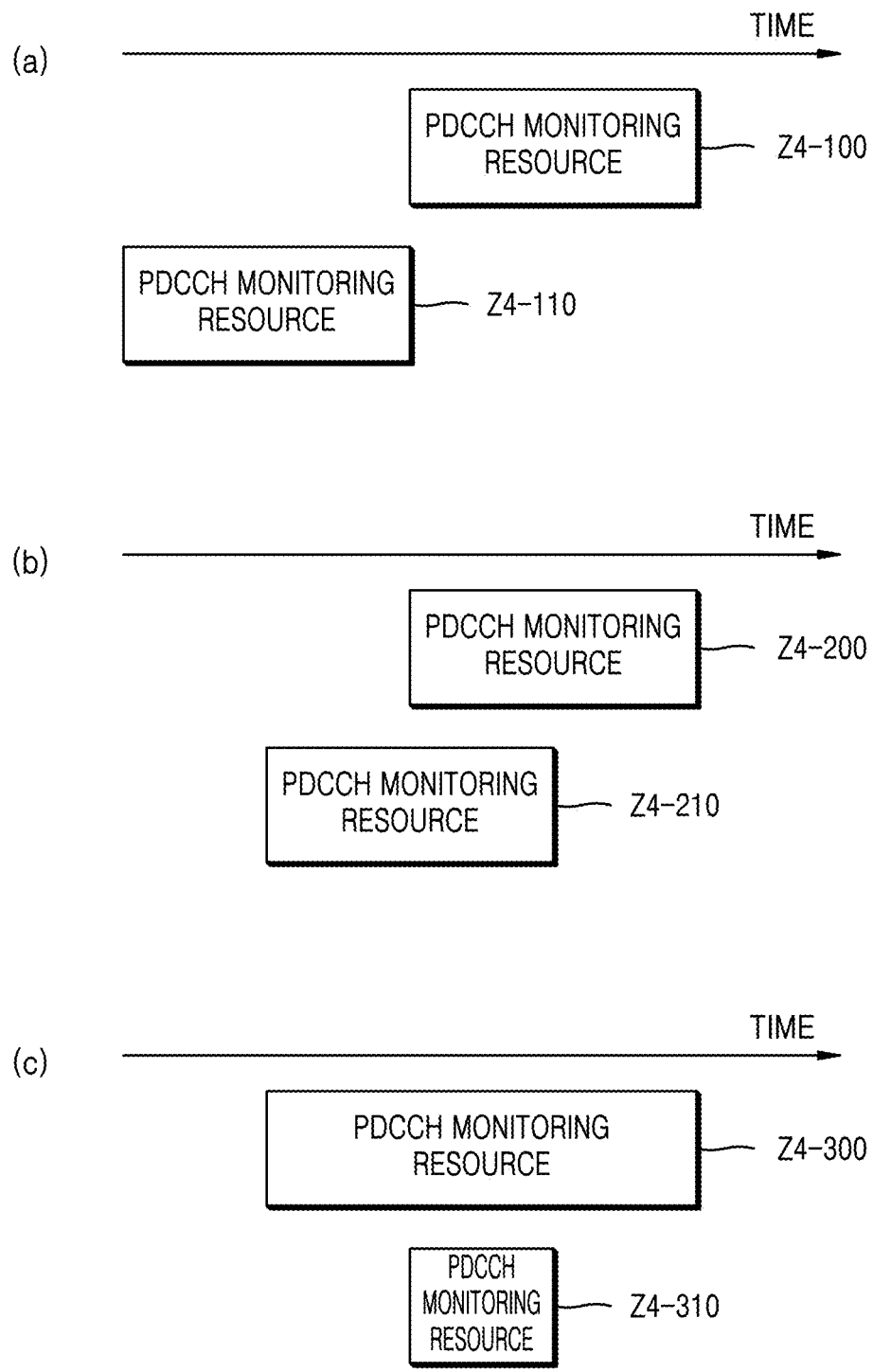
FIG. 9 illustrates a diagram for describing a position relationship on a time axis between two physical downlink control channel (PDCCH) monitoring resources based on a network configuration, according to an embodiment of the disclosure.

FIG. 9 illustrates a diagram for describing a position relationship on a time axis between two PDCCH monitoring resources based on a network configuration, according to an embodiment of the disclosure. Referring to FIG. 9, (a) shows an example where two PDCCH monitoring resources Z4-100 and Z4-110 do not overlap each other on a time axis, (b) shows an example where two PDCCH monitoring resources Z4-200 and Z4-210 partially overlap each other on the time axis, and (c) shows an example where one PDCCH monitoring resource 310 is completely included in another PDCCH monitoring resource Z4-300 on the time axis.

According to an embodiment of the disclosure, PDCCH monitoring resources that do not overlap each other on the time axis may be determined as different PDCCH monitoring occasions. The PDCCH monitoring occasion index may be determined such that the PDCCH monitoring occasion index is greater for a PDCCH monitoring resource located further back on the time axis than for a PDCCH monitoring resource located further front on the time axis. In (a) of FIG. 9, when a PDCCH monitoring occasion index of the PDCCH monitoring resource Z4-110 is k, a PDCCH monitoring occasion index of the PDCCH monitoring resource Z4-100 may be determined as k+n (n>=1). Meanwhile, when another PDCCH monitoring resource does not exist between the PDCCH monitoring resources Z4-110 and Z4-100, the value n may be determined as 1.

Figure 10:
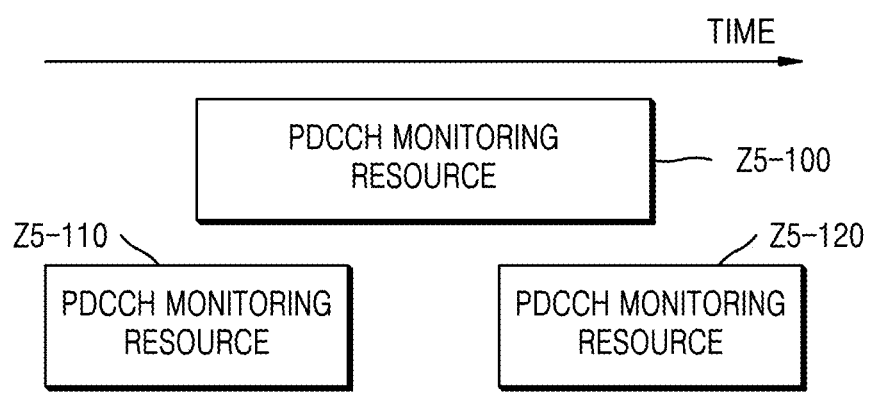
FIG. 10 illustrates a diagram for describing a position relationship on a time axis among three PDCCH monitoring resources based on a network configuration, according to an embodiment of the disclosure.

FIG. 10 illustrates a diagram for describing a position relationship on a time axis among three PDCCH monitoring resources based on a network configuration, according to an embodiment of the disclosure.

In FIG. 10, a PDCCH monitoring resource Z5-110 and a PDCCH monitoring resource Z5-100 partially overlap each other on the time axis, the PDCCH monitoring resource Z5-100 and a PDCCH monitoring resource Z5-120 partially overlap each other on the time axis, and the PDCCH monitoring resource Z5-110 and the PDCCH monitoring resource Z5-120 do not overlap each other on the time axis. As shown in FIG. 10, when PDCCH monitoring resources partially overlapping each other on the time axis are determined as a same PDCCH monitoring occasion, the PDCCH monitoring resource Z5-110 and the PDCCH monitoring resource Z5-120 may be determined as the same PDCCH monitoring occasion.

According to an embodiment of the disclosure, PDCCH monitoring resources that partially overlap each other on the time axis may be determined as different PDCCH monitoring occasions. The PDCCH monitoring occasion index may be determined such that the PDCCH monitoring occasion index is greater for a PDCCH monitoring resource located further back on the time axis than for a PDCCH monitoring resource located further front on the time axis. As described above, in (b) of FIG. 9, when the PDCCH monitoring occasion index of the PDCCH monitoring resource Z4-210 is k, the PDCCH monitoring occasion index of the PDCCH monitoring resource Z4-200 may be determined as k+n (n>=1). When another PDCCH monitoring resource does not exist between the PDCCH monitoring resources Z4-210 and Z4-200, the value n may be determined as 1. In FIG. 10, when a PDCCH monitoring occasion index of the PDCCH monitoring resource Z5-100 is k, a PDCCH monitoring occasion index of the PDCCH monitoring resource Z5-110 may be determined as k+n (n>=1) and a PDCCH monitoring occasion index of the PDCCH monitoring resource Z5-120 may be determined as k+n+o (o>=1).

According to an embodiment of the disclosure, PDCCH monitoring resources that partially overlap each other on the time axis may be determined as different PDCCH monitoring occasions. The PDCCH monitoring occasion index may be determined based on a position of some symbol included in the PDCCH monitoring resource on the time axis. A symbol used to determine the foregoing PDCCH monitoring occasion index may be the last symbol of the PDCCH monitoring resource. When the symbol is positioned further back on the time axis, a PDCCH monitoring occasion index of a PDCCH monitoring resource including the symbol may be determined greater than a PDCCH monitoring occasion index of a PDCCH monitoring resource including a symbol located further front. That is, in (c) of FIG. 9, when a PDCCH monitoring occasion index of the PDCCH monitoring resource Z4-310 is k, the PDCCH monitoring occasion index of the PDCCH monitoring resource Z4-300 may be determined as k+n (n>=1).

Figure 11:
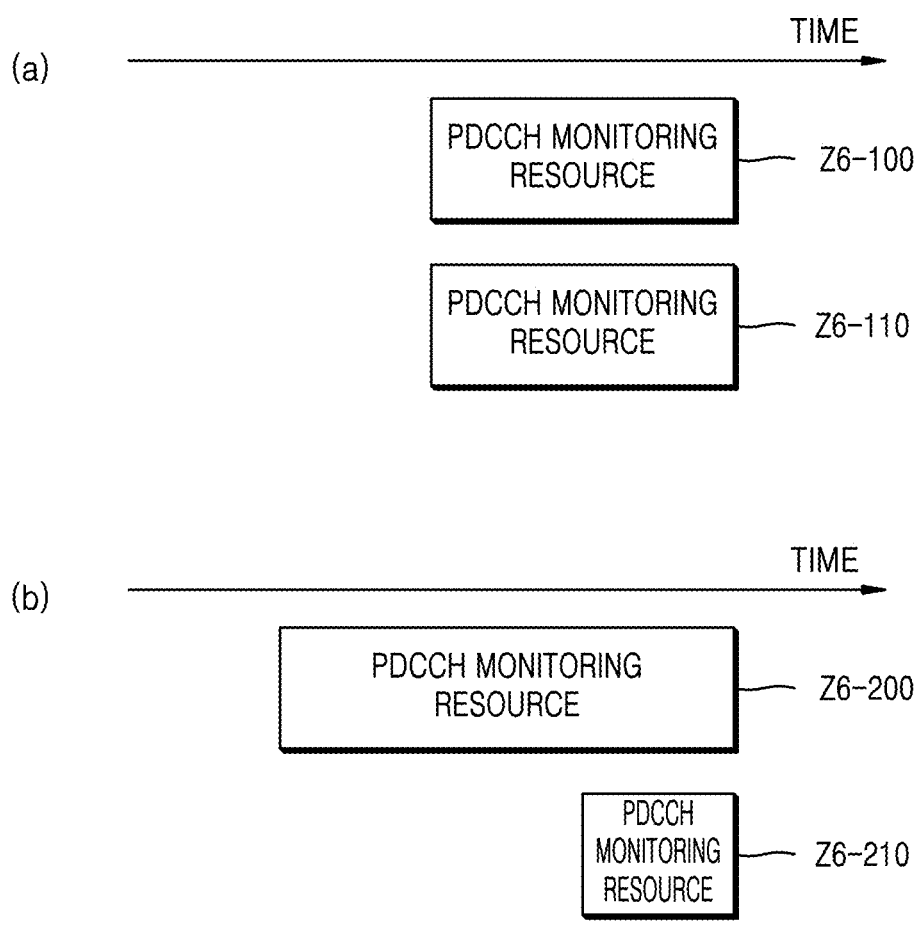
FIG. 11 illustrates a diagram for describing a position relationship on a time axis among two PDCCH monitoring resources based on a network configuration, according to an embodiment of the disclosure.

FIG. 11 illustrates a diagram for describing a position relationship on a time axis among two PDCCH monitoring resources based on a network configuration, according to an embodiment of the disclosure.

Referring to FIG. 11, both (a) and (b) of FIG. 11 show that the last symbol of each PDCCH monitoring resource has a same position on the time axis. According to an embodiment of the disclosure, a PDCCH monitoring occasion index of a PDCCH monitoring resource having a same position of the last symbol may be determined as the same. That is, PDCCH monitoring occasion indexes of a PDCCH monitoring resource Z6-100 and a PDCCH monitoring resource Z6-110 may be determined as the same value. According to an embodiment of the disclosure, even though PDCCH monitoring resources partially overlap each other on the time axis, a PDCCH monitoring occasion index of the PDCCH monitoring resource may be determined as the same when the last symbol of each PDCCH monitoring resource has a same position on the time axis. That is, PDCCH monitoring occasion indexes of a PDCCH monitoring resource Z6-200 and a PDCCH monitoring resource Z6-210 may be determined as the same.

Figure 12:
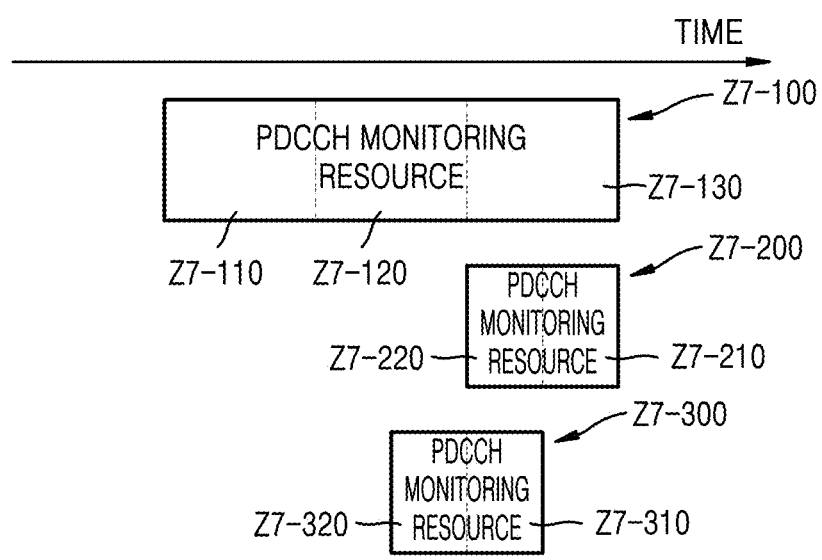
FIG. 12 illustrates a diagram for describing a position relationship on a time axis between two PDCCH monitoring resources based on a network configuration, according to an embodiment of the disclosure.

FIG. 12 illustrates a diagram for describing a position relationship on a time axis between two PDCCH monitoring resources based on a network configuration, according to an embodiment of the disclosure.

A network may be configured to use a different subcarrier spacing μ for each BWP in one carrier. The network may use a different subcarrier spacing μ for each carrier. When a subcarrier spacing used by carriers configured and used by the network for the terminal is different and when a subcarrier spacing of each BWP is different in case of activating and using a plurality of BWPs among BWPs configured by the network for the terminal, a PDCCH monitoring resource of the terminal may include a radio resource having a different subcarrier spacing as shown in FIG. 12. According to an embodiment of the disclosure, a PDCCH monitoring occasion index of a PDCCH monitoring resource may be determined based on a position of a rear boundary of the last symbol of the PDCCH monitoring resource on the time axis. In an embodiment of the disclosure, PDCCH monitoring occasion indexes of PDCCH monitoring resources having the same boundary may be determined as the same value. When the boundary is positioned further back on the time axis, a PDCCH monitoring occasion index of a PDCCH monitoring resource may be determined greater than a PDCCH monitoring occasion index of a PDCCH monitoring resource having a boundary located further front on the time axis. According to an example shown in FIG. 12, a rear boundary of a symbol Z7-130 and a rear boundary of a symbol Z7-210 have the same position on the time axis, such that PDCCH monitoring occasion indexes of a PDCCH monitoring resource Z7-100 and a PDCCH monitoring resource Z7-200 have the same value, and the rear boundary of the symbol Z7-310 is positioned further front on the time axis, such that a corresponding PDCCH monitoring resource (Z7-300) may have a less PDCCH monitoring occasion index. That is, when a PDCCH monitoring occasion index of a PDCCH monitoring resource Z7-300 is k, the PDCCH monitoring occasion indexes of the PDCCH monitoring resource Z7-100 and the PDCCH monitoring resource Z7-200 may be determined as k+n (n>=1).

According to an embodiment of the disclosure, the terminal may attempt DCI detection in PDCCH monitoring occasion index i and Serving Cell index 0. When detected DCI format 1_0 or DCI format 1_1 exists, the terminal may determine a slot index of a PUCCH resource indicated by DCI and may push detected DCI to STACK$_m$ corresponding to the determined slot index m and store the detected DCI. Meanwhile, the terminal may repeat the foregoing operation while increase a serving cell index by 1 until the serving cell index is the same as the number of serving cells set for the terminal. Meanwhile, when the serving cell index is the same as the serving cell index set for the terminal, the terminal may increase the PDCCH monitoring occasion index by 1, set the serving cell index to 0, and repeat the foregoing operation. A PUCCH resource in Slotm may be determined based on DCI resulting from POP execution with respect to Stack$_m$.

According to an embodiment of the disclosure, the terminal may attempt DCI detection in PDCCH monitoring occasion index i and Serving Cell index 0. When detected DCI format 1_0 or DCI format 1_1 exists, the terminal may determine a slot index of a PUCCH resource indicated by DCI and may store a PUCCH resource indicator indicated by the detected DCI in a variable PUCCH_res$_m$ corresponding to the determined slot index m. Meanwhile, the terminal may repeat the foregoing operation while increase a serving cell index by 1 until the serving cell index is the same as the number of serving cells set for the terminal. Meanwhile, when the serving cell index is the same as the serving cell index set for the terminal, the terminal may increase the PDCCH monitoring occasion index by 1, set the serving cell index to 0, and repeat the foregoing operation. A PUCCH resource in Slot$_m$ may be determined as PUCCH_res$_m$.

A network according to an embodiment of the disclosure may set at least one BWP for the terminal. The BWP may be set for the terminal through higher layer signaling, e.g., RRC signaling. The network may transmit data through the set BWP. The network may activate a plurality of BWPs through higher layer signaling (e.g., RRC signaling, MAC CE signaling) or L1 signaling when necessary.

Figure 13:
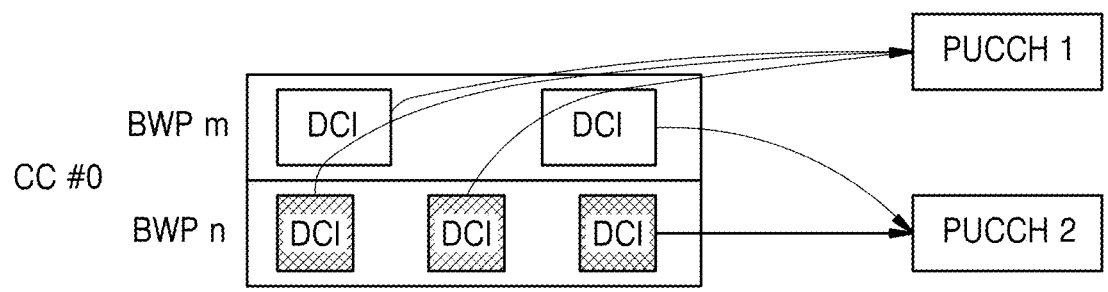
FIG. 13 illustrates a diagram for describing an operation in which downlink control information (DCI) is transmitted through a plurality of activated bandwidth parts, according to an embodiment of the disclosure.

FIG. 13 illustrates a diagram for describing an operation in which downlink control information (DCI) is transmitted through a plurality of activated bandwidth parts, according to an embodiment of the disclosure. Referring to FIG. 13, a plurality of active BWPs may exist in the terminal according to an embodiment of the disclosure, and DCI may be transmitted through the BWPs. Through the DCI transmitted through the plurality of BWPs, PDSCHs may be scheduled. A resource for transmitting corresponding HARQ-ACK may be indicated by the DCI. When the above-described HARQ-ACK transmission PUCCH resource indicates a PUCCH resource corresponding to the same timing, the terminal may need to determine a PUCCH resource for transmitting UL control information.

Figure 14:
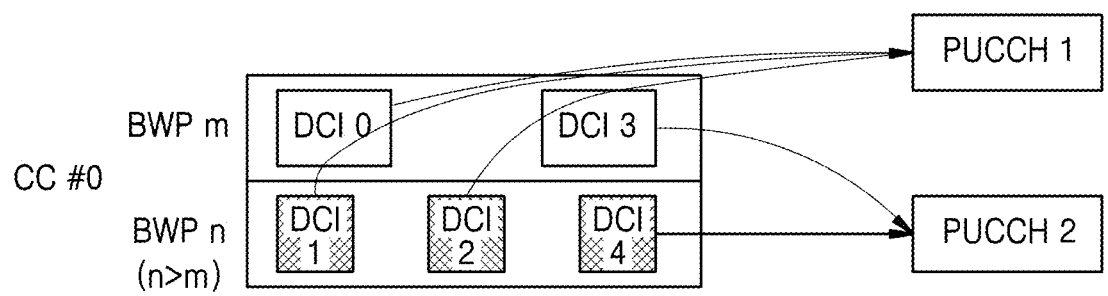
FIG. 14 illustrates a diagram for describing a transmission method according to an embodiment of the disclosure.

FIG. 14 illustrates a diagram for describing a transmission method according to an embodiment of the disclosure. Referring to FIG. 14, a description will be made of a method of determining a PUCCH resource when a PUCCH in which HARQ-ACK information for PDSCHs scheduled by five DCI is transmitted or a PUCCH in which HARQ-ACK information for a PDSCH received based on an SPS configuration have the same timing. With a method according to an embodiment of the disclosure, DCI for scheduling PUCCH resources at the same timing is first arranged (or indexed) using a BWP index (e.g., an ascending order) and then using a PDCCH monitoring occasion. Through arrangement in the foregoing method, the DCI may be arranged in an order of DCI 0, DCI 1, DCI 2, DCI 3, and DCI 4. UL information related to DCI 0, DCI 1, DCI 2, DCI 3, and DCI 4 may be transmitted in PUCCH 2 indicated by the last DCI among the arranged DCI, DCI 4. UL information related to DCI 0, DCI 1, DCI 2, DCI 3, and DCI 4 and PDSCHs associated with the PUCCH resource among PDSCHs received based on an SPS configuration may be transmitted in PUCCH 2 indicated by the last DCI among the arranged DCI, DCI 4.

Figure 15:
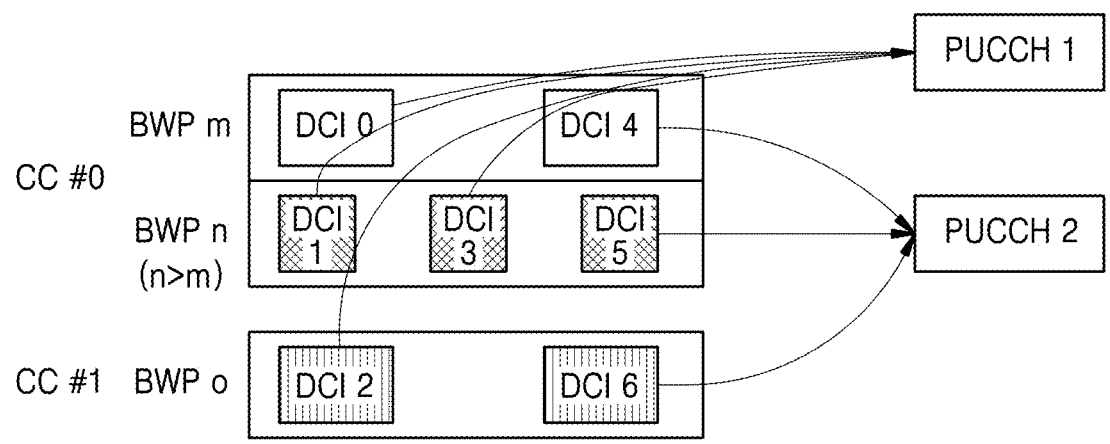
FIG. 15 illustrates a diagram for describing a transmission method according to an embodiment of the disclosure.

FIG. 15 illustrates a diagram for describing a transmission method according to an embodiment of the disclosure. Referring to FIG. 15, a description will be made of a method of determining a PUCCH resource when a PUCCH in which HARQ-ACK information for PDSCHs scheduled by seven DCI is transmitted or a PUCCH in which HARQ-ACK information for a PDSCH received based on an SPS configuration have the same timing. With a method according to an embodiment of the disclosure, DCI for scheduling PUCCH resources at the same timing is first arranged (or indexed) using a BWP index (e.g., an ascending order), then using a serving cell index (an ascending order), and then using a PDCCH monitoring occasion. Through arrangement in the foregoing method, the DCI may be arranged in an order of DCI 0, DCI 1, DCI 2, DCI 3, DCI 4, DCI 5, and DCI 6. UL information related to DCI 0, DCI 1, DCI 2, DCI 3, DCI 4, DCI 5, and DCI 6 may be transmitted in PUCCH 2 indicated by the last DCI among the arranged DCI, DCI 6. UL information related to DCI 0, DCI 1, DCI 2, DCI 3, DCI 4, DCI 5, and DCI 6 and PDSCHs associated with the PUCCH resource among PDSCHs received based on an SPS configuration may be transmitted in PUCCH 2 indicated by the last DCI among the arranged DCI, DCI6.

In a second embodiment of the disclosure, a method and apparatus for configuring UL control information and feeding back the same to an UL may be provided.

Whether the valid HARQ-ACK regarding success of a PDSCH is transmitted to the network through the foregoing PUCCH may be determined in the following method based on a relationship between the PDSCH and the PUCCH. In the following description, a criterion based on which a valid HARQ-ACK is transmitted is not clear when a plurality of PDSCHs are transmitted through a plurality of DCI, requiring clear understanding thereof.

If the first uplink symbol of the PUCCH which carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting $T_{proc,1}=(N_1+d_{1,1})(2048+144)\cdot\kappa 2^{-\mu}\cdot T_C$ after the end of the last symbol of the PDSCH carrying the TB being acknowledged, then the UE shall provide a valid HARQ-ACK message.

According to an embodiment of the disclosure, when a distance on the time axis between 'an end point of the last symbol of the last PDSCH among a plurality of PDSCHs' and 'a start point of a CP of the first symbol of the PUCCH transmission resource, advanced by a timing advance of the terminal' is greater than or equal to a particular value (e.g., $T_{proc,1}=(N_1+d_{1,1})(2048+144)\cdot\kappa 2^{-\mu}\cdot T_C$) (i.e., resources satisfy a time condition), the terminal may multiplex valid HARQ-ACK information for the plurality of PDSCHs and transmit the multiplexed HARQ-ACK information through a PUCCH resource.

According to an embodiment of the disclosure, when a distance on the time axis between 'an end point of the last symbol of the last PDSCH among a plurality of PDSCHs' and 'a start point of a CP of the first symbol of the PUSCH transmission resource, advanced by a timing advance of the terminal' is greater than or equal to a particular value (e.g., $T_{proc,1}=(N_1+d_{1,1})(2048+144)\cdot\kappa 2^{-\mu}\cdot T_C$) (that is, when resources satisfy a time condition), the terminal may multiplex valid HARQ-ACK information for the plurality of PDSCHs and transmit the multiplexed HARQ-ACK information through a PUSCH resource.

According to an embodiment of the disclosure, when the resources fail to satisfy the foregoing time condition, the terminal may not transmit valid HARQ-ACK information. According to an embodiment of the disclosure, when there are at least one PDSCH(s) failing to satisfy the time condition, the terminal may not transmit the valid HARQ-ACK information for all PDSCH(s).

Otherwise, the terminal may not be required to provide valid HARQ-ACK information as defined by the assigned HARQ-ACK timing K1.

According to an embodiment of the disclosure, the terminal may drop PUCCH transmission including at least one invalid HARQ-ACK information. According to an embodiment of the disclosure, the terminal may drop PUSCH transmission including at least one invalid HARQ-ACK information.

According to an embodiment of the disclosure, when PUCCH repeated transmission is set in the terminal, the terminal may start PUCCH transmission from a resource that at least satisfies a time condition without performing PUCCH transmission in a resource that fails to satisfy the foregoing time condition. According to an embodiment of the disclosure, when n times of PUCCH repeated transmission is set for the terminal and m PUCCH resources fail to satisfy the foregoing time condition, (n−m) times of PUCCH transmission may be performed, starting from a PUCCH resource satisfying the time condition (i.e., a resource located further back on the time axis). According to an embodiment of the disclosure, when n times of PUCCH repeated transmission is set for the terminal and m PUCCH resources fail to satisfy the foregoing time condition, n times of PUCCH transmission may be performed, starting from a PUCCH resource satisfying the time condition. According to an embodiment of the disclosure, a transmission method for a case where PUCCH repeated transmission is set for the above-described UE may be applied equally to a case where PUSCH repeated transmission is set.

According to an embodiment of the disclosure, the terminal may configure HARQ-ACK bit(s) for PDSCH(s) failing to satisfy the above-described time condition as NACK(s) and HARQ-ACK bit(s) for PDSCH(s) satisfying the time condition as valid HARQ-ACK information, and transmit the HARQ-ACK information. According to an embodiment of the disclosure, the terminal may basically configure HARQ-ACK information for all PDSCH(s) as NACK, and update corresponding HARQ-ACK information as valid HARQ-ACK information at the time of completion of each PDSCH decoding.

According to an embodiment of the disclosure, the terminal may transmit only HARQ-ACK bit(s) for PDSCH(s) satisfying the foregoing time condition as HARQ-ACK information. According to an embodiment of the disclosure, when a bitwidth of HARQ-ACK corresponding to scheduled PDSCH(s) is N bits and a bitwidth of HARQ-ACK corresponding to PDSCH(s) failing to satisfy the foregoing time condition is M bits, the terminal may configure a HARQ-ACK codebook with N-M bits and transmit the same.

According to an embodiment of the disclosure, when the PDSCH(s) fails to satisfy the foregoing time condition, the terminal may process the PDSCH(s) failing to satisfy the time condition as not being transmitted to the terminal. According to an embodiment of the disclosure, when the base station transmits N PDSCH(s) in practice, among which M PDSCH(s) fail to satisfy the time condition, the terminal may process the M PDSCH(s) failing to satisfy the time condition as not being transmitted, and thus configure HARQ-ACK information for (N-M) PDSCH(s) except for the M PDSCH(s) as HARQ-ACK information and transmit the same.

Whether the valid HARQ-ACK regarding success of a PDSCH is transmitted to the network through the PUCCH may be determined in the following method based on a relationship between the PDSCH and the PUCCH. In the following description of the processing time, clear understanding between the base station and the terminal for the start point of the last symbol of the PDSCH may be required.

If the first uplink symbol of the PUCCH which carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting $T_{proc,1} = (N_1 + d_{1,1})(2048 + 144) \cdot \kappa 2^{-\mu} \cdot T_C$ after the end of the last symbol of the PDSCH carrying the TB being acknowledged, then the UE shall provide a valid HARQ-ACK message.

Figure 16:
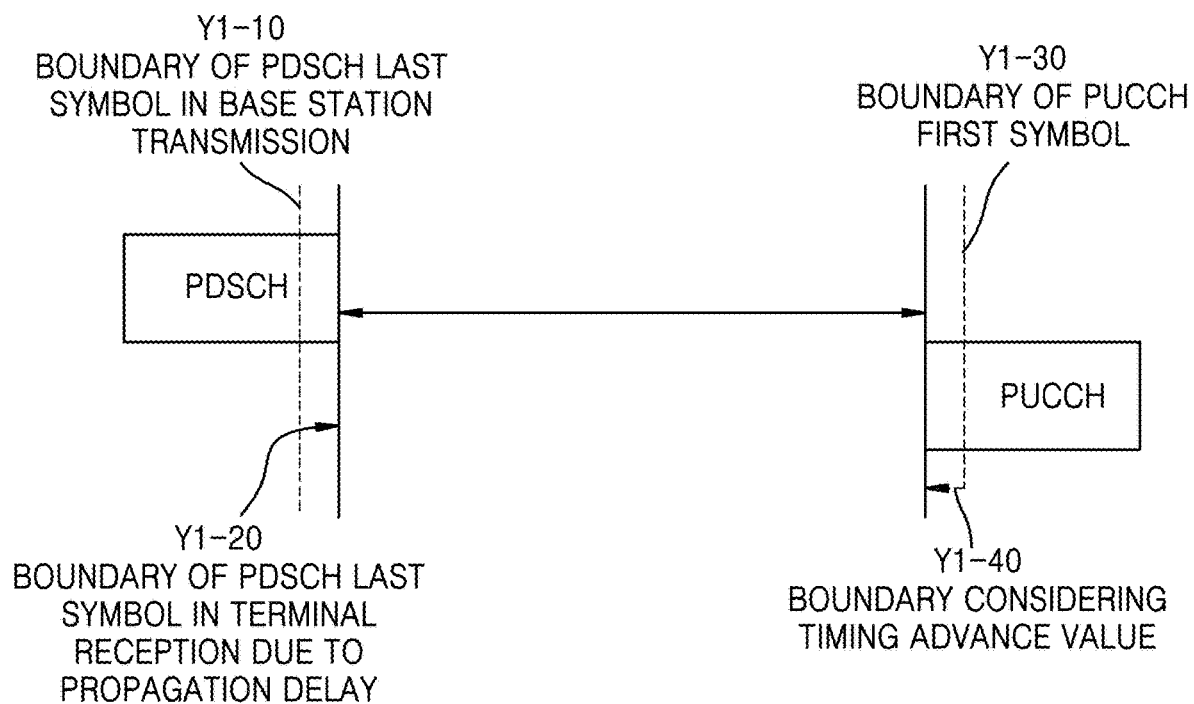
FIG. 16 illustrates a diagram for describing a relationship between physical uplink control channels (PUCCHs) for transmitting a physical downlink shared channel (PDSCH) and a hybrid automatic repeat request (HARD)-acknowledgement (ACK) corresponding to the PDSCH, according to an embodiment of the disclosure.

FIG. 16 illustrates a diagram for describing a relationship between PUCCHs for transmitting a PDSCH and HARQ-ACK corresponding to the PDSCH, according to an embodiment of the disclosure. A propagation delay may occur until a transmission signal of the base station arrives at the terminal, depending on a position between the base station and the terminal. According to an embodiment of the disclosure, the end point of the last symbol of the PDSCH for determining whether valid HARQ-ACK regarding success in reception of the PDSCH is transmitted to the network may be a boundary Y1-20 of the last symbol of the PDSCH received by the terminal.

Figure 17:
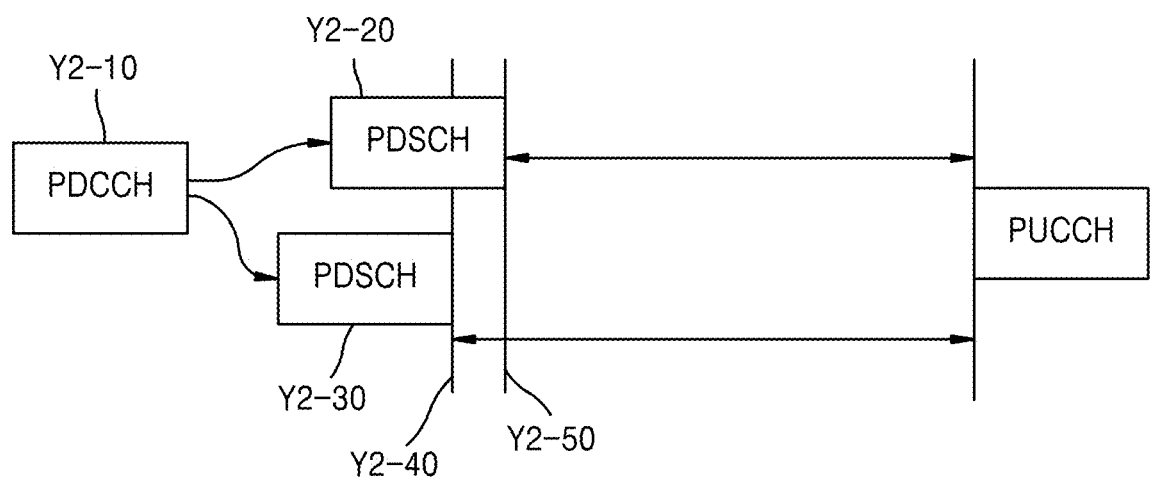
FIG. 17 illustrates a diagram for describing a relationship between a plurality of PDSCHs and PUCCH resources for transmitting HARQ-ACKs corresponding to the plurality of PDSCHs when a DCI transmitted through one PDCCH is scheduled through the plurality of PDSCHs, according to an embodiment of the disclosure.

FIG. 17 illustrates a diagram for describing a relationship between a plurality of PDSCHs and PUCCH resources for transmitting HARQ-ACKs corresponding to the plurality of PDSCHs when a DCI transmitted through one PDCCH is scheduled through the plurality of PDSCHs, according to an embodiment of the disclosure.

Referring to FIG. 17, above-described PDSCHs Y2-20 and Y2-30 may include the same TB. According to an embodiment of the disclosure, the end point of the last symbol of the PDSCH for determining whether valid HARQ-ACK regarding success in reception of the PDSCHS is transmitted to the network may be a boundary Y2-20 of the last symbol of the PDSCH received last by the terminal among the plurality of PDSCHs. According to an embodiment of the disclosure, the end point of the last symbol of the PDSCH for determining whether valid HARQ-ACK regarding success in reception of the PDSCH is transmitted to the network may be based on an index of a time resource to which the plurality of PDSCHs are mapped. For example, a time resource index (i.e., a slot number and a symbol number) of the last symbol of the PDSCH Y2-20 and a time resource index of the last symbol of the PDSCH Y2-30 may be compared and the end point may be based on a symbol located further back on the time axis.

Meanwhile, the above-described PDSCHs Y2-20 and Y2-30 may include different TBs. According to an embodiment of the disclosure, whether valid HARQ-ACKs regarding success in reception of TBs transmitted through PDSCHs are transmitted to the network may be based on a boundary of the last symbol of each PDSCH. For example, valid HARQ-ACK transmission for TB transmission made through the PDSCH Y2-20 may be based on a time of Y2-50 and valid HARQ-ACK transmission for TB transmission made through the PDSCH Y2-30 may be based on a time of Y2-40.

The terminal may set an HARQ-ACK corresponding to the PDSCH as a NACK before PDSCH decoding. The terminal may update the HARQ-ACK as an ACK when PDSCH decoding is completed and a result thereof is successful. When PDSCH decoding is completed before an HARQ-ACK transmission timing and HARQ-ACK information is updated, the terminal may transfer the updated information; when the HARQ-ACK information is not updated, the terminal may transmit previously configured HARQ-ACK information. Even when decoding is not completed until the HARQ-ACK transmission timing, the terminal may continue decoding and generate the HARQ-ACK information. Thereafter, the terminal may determine whether a PDSCH scheduled based on DCI transmitted by the network through a PDCCH corresponds to retransmission, and when the PDSCH corresponds to retransmission and the HARQ-ACK information generated through the above-described decoding is an ACK, the terminal may transmit an ACK in a newly determined HARQ-ACK information transmission resource without receiving or decoding the retransmitted PDSCH. When the PDSCH corresponds to retransmission and the HARQ-ACK information generated through the above-described decoding is a NACK, the terminal may receive the retransmitted PDSCH and perform PDSCH decoding through a combining operation based on a designated HARQ scheme.

In a third embodiment of the disclosure, a method and apparatus for analyzing and determining HARQ-ACK feedback timing information may be provided.

PUCCH transmission including UL control information like HARQ-ACK information regarding success in reception of the PDSCH according to an embodiment of the disclosure may be determined based on DCI transmitted through a PDCCH. When a plurality of DCI indicate PUCCH transmission at the same timing and DCI indicating PUCCH transmission at the same timing indicate different PUCCH resources, the terminal may determine a PUCCH resource in which an UL control signal is to be transmitted. This may be determined as follows:

For a PUCCH transmission with HARQ-ACK information, a UE determines a PUCCH resource after determining a set of PUCCH resources for $O_{UC1}$ HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 that have a value of a PDSCH-to-HARQ feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes.

DCI format 1_0 may fixedly include a PDSCH-to-HARQ feedback timing indicator of 3 bits. Meanwhile, the number of bits of the PDSCH-to-HARQ feedback timing indicator included in DCI format 1_1 may be determined by higher layer signaling (e.g., RRC signaling). For example, the number of entries of a dl-DataToUL-ACK parameter included in RRC signaling is I, DCI format 1_1 may include bits of $\lceil \log_2(I) \rceil$ as a PDSCH-to-HARQ feedback timing indicator. The network according to an embodiment of the disclosure may set one entry of a dl-DataToUL-ACK parameter for the terminal. In this case, DCI format 1_1 of a PDCCH to be monitored by the terminal may have 0 bits as a PDSCH-to-HARQ feedback timing indicator.

In an embodiment of the disclosure where a PDSCH-to-HARQ feedback timing indicator is 0 bits, the network may set one entry of the dl-DataToUL-ACK parameter for the terminal. In this case, a field for a PDSCH-to-HARQ feedback timing indicator may not exist (or may not be present) in DCI format 1_1 of a PDCCH to be monitored by the terminal. In this case, in a process of determining a PUCCH transmission resource, a problem may occur in how to process such DCI.

Figure 17A:
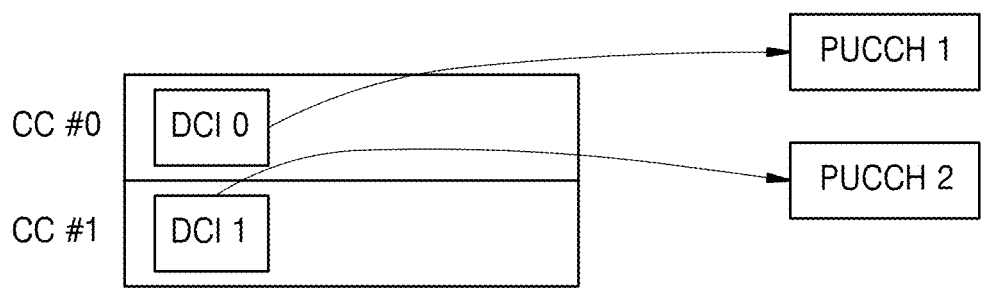
FIG. 17A illustrates a DCI transmission process according to an embodiment of the disclosure.

FIG. 17A illustrates a DCI transmission process according to an embodiment of the disclosure. More specifically, FIG. 17A shows a case where a plurality of serving cells may be set for the terminal and DCI 0 and DCI 1 are transmitted in which a field for a PDSCH-to-HARQ feedback timing indicator does not exist in an identical PDCCH monitoring occasion of each serving cell. In this case, a field for a PDSCH-to-HARQ feedback timing indicator does not exist in DCI 0 and DCI 1, such that a PUCCH resource may not be determined using a method described in the above.

According to an embodiment of the disclosure, when the number of entries of the dl-DataToUL-ACK parameter set for the terminal by the network is one, the terminal or the base station may regard the value of the one set dl-DataToUL-ACK parameter as a value of the PDSCH-to-HARQ feedback timing indicator.

According to an embodiment of the disclosure, when a PDSCH-to-HARQ feedback timing indicator does not actually exist as 0 bits, the terminal or base station may assume that there is a virtual PDSCH-to-HARQ feedback timing indicator field and perform processing. The terminal or the base station may process a virtual PDSCH-to-HARQ feedback timing indicator field value as a particular value. According to an embodiment of the disclosure, as the particular value, a value designated through higher layer signaling (e.g., RRC signaling) may be used. According to an embodiment of the disclosure, the particular value may be a dl-DataToUL-ACK parameter designated through RRC signaling. According to an embodiment of the disclosure, when the PDSCH-to-HARQ feedback timing indicator field does not actually exist in a process of determining a PUCCH transmission resource, the terminal and the base station may perform processing assuming that the dl-DataToUL-ACK parameter designated through RRC signaling exists in the PDSCH-to-HARQ feedback timing indicator field. According to an embodiment of the disclosure, an UL control signal transmission method may be determined as below.

For a PUCCH transmission with HARQ-ACK information, a UE determines a PUCCH resource after determining a set of PUCCH resources for $O_{UCI}$ HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 with a value of a PDSCH-to-HARQ feedback timing indicator field, if present, or provided by dl-DataToUL-ACK indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes.

That is, based on the foregoing embodiments of the disclosure, even when the PDSCH-to-HARQ feedback timing indicator field does not exist in DCI, the terminal may determine a PUCCH resource. For example, in FIG. 17A, as in the above-described embodiment of the disclosure, PUCCH2 indicated by DCI 1 may be determined as a transmission resource.

In determination of a PUCCH transmission resource, a first CCE index $n_{CCE,p}$ to which a PDCCH is mapped, a value of a 'PUCCH resource indicator' field in DCI transmitted through the PDCCH may be used, and a slot in which a PUCCH is transmitted may be determined as a value of a 'PDSCH-to-HARQ feedback timing indicator' field. In this case, when the 'PDSCH-to-HARQ feedback timing indicator' field in the DCI transmitted through the PDCCH does not exist, that is, the field has a value of 0 bits, the slot may not be determined.

According to an embodiment of the disclosure, when the 'PDSCH-to-HARQ feedback timing indicator' field does not exist, the terminal and the base station may assume that the field exists, and use a dl-DataToUL-ACK parameter value designated through RRC signaling as a value of the field.

For the first set of PUCCH resources and when the size $R_{PUCCH}$ of resourceList is larger than eight, when a UE provides HARQ-ACK information in a PUCCH transmission in response to detecting a last DCI format 1_0 or DCI format 1_1 in a PDCCH reception, among DCI formats 1_0 or DCI formats 1_1 with a value of the PDSCH-to-HARQ feedback timing indicator field if present, or provided by dl-DataToUL-ACK indicating a same slot for the PUCCH transmission, the UE determines a PUCCH resource with index $r_{PUCCH}$, $0 \leq r_{PUCCH} \leq R_{PUCCH} - 1$, as $$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where $N_{CCE,p}$ is a number of CCEs in CORESET p of the PDCCH reception for the DCI format 1_0 or DCI format 1_1 as described in Subclause 10.1, $n_{CCE,p}$ is the index of a first CCE for the PDCCH reception, and $\Delta_{PRI}$ is a value of the PUCCH resource indicator field in the DCI format 1_0 or DCI format 1_1.

A base station according to an embodiment of the disclosure may set a pdsch-HARQ-ACK-Codebook parameter to be semi-static such that the terminal and the base station use a type-1 HARQ-ACK codebook. In this case, when whether to map HARQ-ACK information or NACK information to each of bits of the type-1 HARQ-ACK codebook is determined, a PDSCH-to-HARQ feedback timing indicator field may be used. When that field does not exist, the bit values of the HARQ-ACK codebook may not be determined.

According to an embodiment of the disclosure, when the 'PDSCH-to-HARQ feedback timing indicator' field does not exist, the terminal and the base station may assume that the field exists, and use a dl-DataToUL-ACK parameter value designated through RRC signaling as a value of the field.

A UE reports HARQ-ACK information for a corresponding PDSCH reception or SPS PDSCH release only in a HARQ-ACK codebook that the UE transmits in a slot indicated by a value of a PDSCH-to-HARQ feedback timing indicator field in a corresponding DCI format 1_0 or DCI format 1_1 or, for DCI format 1_1, provided by dl-DataToUL-ACK if the PDSCH-to-HARQ feedback timing indicator field is not present. The UE reports NACK value(s) for HARQ-ACK information bit(s) in a HARQ-ACK codebook that the UE transmits in a slot not indicated by a value of a PDSCH-to-HARQ feedback timing indicator field in a corresponding DCI format 1_0 or DCI format 1_1 or, for DCI format 1_1, provided by dl-DataToUL-ACK if the PDSCH-to-HARQ feedback timing indicator field is not present.

The terminal according to an embodiment of the disclosure may multiplex HARQ-ACK information, scheduling request (SR) information, and channel state information (CSI) and transmit through the PUCCH resource. In this case, a PUCCH resource may be determined through a value of a 'PUCCH resource indicator' field in the last DCI having a value of a 'PDSCH-to-HARQ feedback timing indicator' field. In this case, when the 'PDSCH-to-HARQ feedback timing indicator' field does not exist, the PUCCH resource may not be determined.

According to an embodiment of the disclosure, when the 'PDSCH-to-HARQ feedback timing indicator' field does not exist, the terminal and the base station may assume that the field exists, and use a dl-DataToUL-ACK parameter value designated through RRC signaling as a value of the field.

If a UE has HARQ-ACK, SR and wideband or sub-band CSI reports to transmit and the UE determines a PUCCH resource with PUCCH format 2, or the UE has HARQ-ACK, SR and wideband CSI reports [6, TS 38.214] to transmit and the UE determines a PUCCH resource with PUCCH format 3 or PUCCH format 4, where
 the UE determines the PUCCH resource using the PUCCH resource indicator field [5, TS 38.212] in a last DCI format 1_0 or DCI format 1_1, from DCI formats 1_0 or DCI formats 1_1 that have a value of a PDSCH-to-HARQ feedback timing indicator field, if present, or provided by dl-DataToUL-ACK indicating a same slot for the PUCCH transmission, from a PUCCH resource set provided to the UE for HARQ-ACK transmission, and
 the UE determines the PUCCH resource set as described in Subclause 9.2.1 and Subclause 9.2.3 for $O_{UCI}$ UCI bits If a UE has HARQ-ACK, SR and sub-band CSI reports to transmit and the UE determines a PUCCH resource with PUCCH format 3 or PUCCH format 4, where
 the UE determines the PUCCH resource using the PUCCH resource indicator field [5, TS 38.212] in a last DCI format 1_0 or DCI format 1_1, from DCI formats 1_0 or DCI formats 1_1 that have a value of a PDSCH-to-HARQ_feedback timing indicator field, if present, or provided by dl-DataToUL-ACK indicating a same slot for the PUCCH transmission, from a PUCCH resource set provided to the UE for HARQ-ACK transmission, and
 the UE determines the PUCCH resource set as described in Subclause 9.2.1 and Subclause 9.2.3 for $O_{UCI}$ UCI bits According to an embodiment of the disclosure, when a value of a PDSCH-to-HARQ_feedback timing indicator field in DCI is 0 bits, the terminal and the base station may process the value of the PDSCH-to-HARQ_feedback timing indicator field assuming that the value is set as dl-DataToUL-ACK.

If PDSCH-to-HARQ_feedback timing indicator field is not present in a DCI format, a UE assumes that a value PDSCH-to-HARQ_feedback timing indicator field is provided by a value of dl-DataToUL-ACK.

When a plurality of serving cells are designated for the terminal by the base station, each serving cell(s) may be activated by an activation command transmitted through a PDSCH. Upon receiving the activation command in a slot n, the terminal may apply the activation command after a slot (n+k). Foregoing k may be calculated as $k_1 + 3 \cdot N_{slot}^{subframe,\mu} + 1$, $\mu$ may indicate a subcarrier spacing, and $N_{slot}^{subframe,\mu}$ may indicate the number of slots per subframe in a subcarrier spacing $\mu$. $k_1$ may indicate a value of a PDSCH-to-HARQ_feedback timing indicator field in DCI scheduling the PDSCH. A problem may occur in regard to how to deal with a case where the PDSCH-to-HARQ_feedback timing indicator field does not exist in the DCI.

According to an embodiment of the disclosure, when the PDSCH-to-HARQ_feedback timing indicator field exists in DCI scheduling the PDSCH for transmitting an activation command of serving cell(s), the terminal and the base station may calculate $k = k_1 + 3 \cdot N_{slot}^{subframe,\mu} + 1$ by using a value of the field as $k_1$; unless the field does not exist in the DCI, the terminal and the base station may calculate k by using a value of dl-DataToUL-ACK set in an higher layer, e.g., an RRC layer.

With reference to slots for PUCCH transmissions, when a UE receives in a PDSCH an activation command [11, TS 38.321] for a secondary cell ending in slot n, the UE applies the corresponding actions in [11, TS 38.321] no later than the minimum requirement defined in [10, TS 38.133] and no earlier than slot n+k, except for the following:
 the actions related to CSI reporting on a serving cell that is active in slot n+k
 the actions related to the sCellDeactivationTimer associated with the secondary cell [11, TS 38.321] that the UE applies in slot n+k
 the actions related to CSI reporting on a serving cell which is not active in slot n+k that the UE applies in the earliest slot after n+k in which the serving cell is active.

The value of k is $k_1 + 3 \cdot N_{slot}^{subframe,\mu} + 1$ where $k_1$ is a number of slots for a PUCCH transmission with HARQ-ACK information for the PDSCH reception and is indicated by the PDSCH-to-HARQ feedback timing indicator field in the DCI format scheduling the PDSCH reception or provided by dl-DataToUL-ACK if the PDSCH-to-HARQ feedback timing indicator field is not present in the DCI format as described in Subclause 9.2.3 and $N_{slot}^{subframe,\mu}$ is a number of slots per subframe for the SCS configuration $\mu$ of the PUCCH transmission.

Figure 17B:
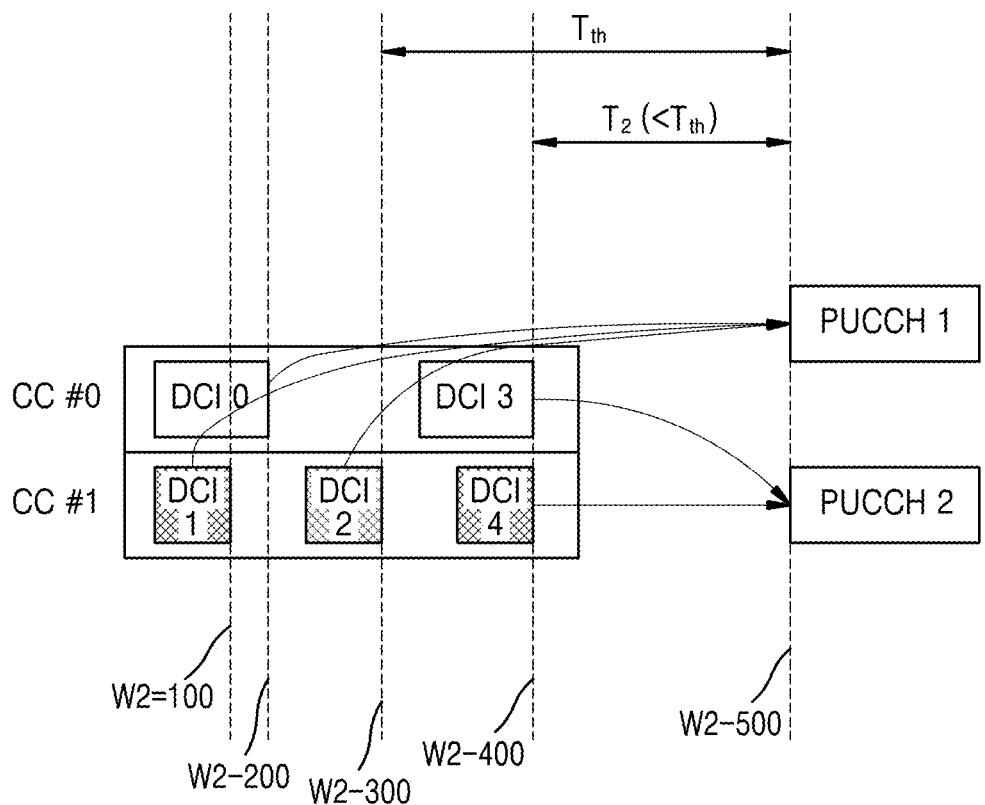
FIG. 17B illustrates a method of indicating a PUCCH resource of a DCI, according to an embodiment of the disclosure.

FIG. 17B illustrates a method of indicating a PUCCH resource of a DCI, according to an embodiment of the disclosure. More specifically, FIG. 17B shows a case where all DCI indicate a PUCCH resource located in the same slot. When DCI 3 and DCI 4 are received at a timing that does not satisfy a processing time condition of the terminal (i.e., $T_{th} = N_3 \cdot (2048+144) \cdot \kappa \cdot 2^{-\mu} \cdot T_c$), DCI 3 and DCI 4 may be included in a set of DCI used in determining a PUCCH transmission resource for HARQ-ACK information transmission. In this case, PUCCH 2 indicated by DCI 4 is used according to the rule of the foregoing table, and when PUCCH 2 is not included, PUCCH 1 indicated by DCI 2 may be used. According to contents of the foregoing table, which DCIs are included in a DCI set transmitted through PDCCHs used in determining a PUCCH transmission resource for HARQ-ACK information transmission may not be clear, and thus needs to be clarified.

According to an embodiment of the disclosure, all DCI indicating a PUCCH resource located in the same slot may be included in a DCI set transmitted through PDCCHs used in determining a PUCCH transmission resource for HARQ-ACK information transmission, regardless of a processing time condition of the terminal. That is, in FIG. 17B, a distance on the time axis between a reception point W2-400 of DCI 3 and DCI 4 and a start point W2-500 of the first symbol of a PUCCH resource may be less than $N_3 \cdot (2048+144) \cdot \kappa 2^{-\mu} \cdot T_C)|$, but DCI 3 and DCI 4 may also be considered in determining the PUCCH transmission resource, and in this case, the PUCCH transmission resource may be determined as PUCCH 2 indicated by DCI 4.

For a PUCCH transmission with HARQ-ACK information, a UE determines a PUCCH resource after determining a set of PUCCH resources for $O_{UCI}$ HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 that have a value of a PDSCH-to-HARQ feedback timing indicator field, if present, or provided by dl-DataToUL-ACK indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes, where the PDCCH receptions that includes detected DCI formats are not earlier than $N_3 \cdot (2048+144) \cdot \kappa 2^{-\mu} \cdot T_C$ from the beginning of a first symbol of the first resource for PUCCH transmission in the slot where, $\kappa$ and $T_C$ are defined in subclause 4.1 of [4, TS 38.211] and $\mu$ corresponds to the smallest SCS configuration among the SCS configurations of the PDCCHs providing the DCI formats and the SCS configuration of the PUCCH. If processingType2Enabled of PDSCH-ServingCellConfig is set to enable for the serving cell with the second DCI format and for all serving cells with corresponding HARQ-ACK information multiplexed in the PUCCH transmission in the slot, $N_3=3$ for $\mu=0$, $N_3=4.5$ for $\mu=1$, $N_3=9$ for $\mu=2$; otherwise, $N_3=8$ for $\mu=0$, $N_3=10$ for $\mu=1$, $N_3=17$ for $\mu=2$, $N_3=20$ for $\mu=3$.

According to an embodiment of the disclosure, a processing time of a terminal may be considered in a process of determining a PUCCH transmission resource. For example, a processing time of a terminal may be considered in a process of determining a set of DCI transmitted through PDCCHs used to determine a PUCCH transmission resource. In the foregoing embodiment of the disclosure, a PDCCH transmission resource in which DCI included in a 'set of DCI used to determine a PUCCH transmission resource' is transmitted may be located at least a certain time before a start point of the first symbol of the PUCCH transmission resource. An end point of the last symbol of a PDCCH transmission resource in which DCI included in a 'set of DCI used to determine a PUCCH transmission resource' is transmitted may be located at least a certain time before a start point of the first symbol of the PUCCH transmission resource. DCI transmitted through the PDCCH transmission resource that does not satisfy the foregoing time condition may not be included in a set of DCI used to determine a PUCCH transmission resource.

That is, in FIG. 17B, distances of a reception point W2-100 of DCI 0, a reception point W2-200 of DCI 1, and a reception point W2-300 of DCI 2 from a start point W2-500 of the first symbol of the PUCCH resource on the time axis may be greater than or equal to $N_3 \cdot (2048+144) \cdot \kappa 2^{-\mu} \cdot T_C|$, such that DCI 0, DCI 1, and DCI 2 may be included, and distances of a reception point W2-400 of DCI 3 and a reception point W2-400 of DCI 4 from the start point W2-300 of the first symbol of the PUCCH resource on the time axis may be less than $N_3 \cdot (2048+144) \cdot \kappa 2^{-\mu} \cdot T_C|$, and thus DCI 3 and DCI 4 may not be included. Referring to FIG. 17B, as PUCCH 1 indicated by DCI 2 transmitted in the last PDCCH monitoring resource among DCI 0, DCI 1, and DCI 2 included in the 'set of DCI used to determine a PUCCH transmission resource', a PUCCH transmission resource may be determined.

According to an embodiment of the disclosure, when DCI related to PUCCHs transmitted at the same timing is detected, the DCI may be first arranged based on serving cell indexes. Next, the DCI may be arranged based on PDCCH monitoring occasions. In this case, the terminal may expect that reception of a PDCCH in which DCI is transmitted is located at least $N_3 \cdot (2048+144) \cdot \kappa 2^{-\mu} \cdot T_C|$ before the start point of the first symbol of the PUCCH resource. That is, DCI satisfying a condition that a distance between a start point of the first symbol of a PUCCH resource and a reception time of the PDCCH on the time axis is greater than at least $N_3 \cdot (2048+144) \cdot \kappa 2^{-\mu} \cdot T_C|$ may be arranged according to the foregoing arrangement rule, and DCI failing to satisfy the condition may be ignored. Alternatively, DCI satisfying a condition that a distance between a start point of the first symbol of a PUCCH resource and a reception time of the PDCCH on the time axis is greater than or equal to at least $N_3 \cdot (2048+144) \cdot \kappa 2^{-\mu} \cdot T_C|$ may be arranged according to the foregoing arrangement rule, and DCI failing to satisfy the condition may be ignored. k may be a result, 64, of dividing $T_s$ by $T_C$, and $T_s$ may be $1/(\Delta f_{ref} \cdot N_{f,ref})$. Herein, $\Delta_{ref}$ may be $15 \cdot 10^3$ Hz, and $N_{f,ref}$ ref may be 2048. Tc may be $1/(\Delta f_{max} \cdot N_f)$, where $\Delta f_{max}$ may be $480 \cdot 10^3$ Hz and Nf may be 4096. $\mu$ may correspond to a minimum value among a SCS configuration of a PUCCH and a SCS configuration of a PDCCH providing the last DCI. $N_3$ may be determined as shown in Table 15 by $\mu$ and processingType2Enabled in PDSCH-ServingCellConfig.

TABLE 15

|  | $\mu = 0$ | $\mu = 1$ | $\mu = 2$ | $\mu = 3$ |
| --- | --- | --- | --- | --- |
| processingType2Enabled = 'enable' | 3 | 4.5 | 9 |  |
| processingType2Enabled = 'disable' | 8 | 10 | 17 | 20 |

For a PUCCH transmission with HARQ-ACK information, a UE determines a PUCCH resource after determining a set of PUCCH resources for $O_{UCI}$ HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 that have a value of a PDSCH-to-HARQ feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes. The UE expects that the PDCCH reception that includes the last DCI format is earlier than $N_3 \cdot (2048+144) \cdot \kappa 2^{-\mu} \cdot T_C$ from the beginning of a first symbol of the determined PUCCH resource in the slot where $\kappa$ and $T_C$ are defined in subclause 4.1 of [4, TS 38.211] and μ corresponds to the smallest SCS configuration among the SCS configurations of the PDCCH providing the last DCI format and the SCS configuration of the PUCCH. If processingType2Enabled of PDSCH-ServingCellConfig is set to enable for the serving cell with the last DCI format and for all serving cells with corresponding HARQ-ACK information multiplexed in the PUCCH transmission in the slot, $N_3=3$ for $\mu=0$, $N_3=4.5$ for $\mu=1$, $N_3=9$ for $\mu=2$; otherwise, $N_3=8$ for $\mu=0$, $N_3=10$ for $\mu=1$, $N_3=17$ for $\mu=2$, $N_3=20$ for $\mu=3$.

Figure 18:
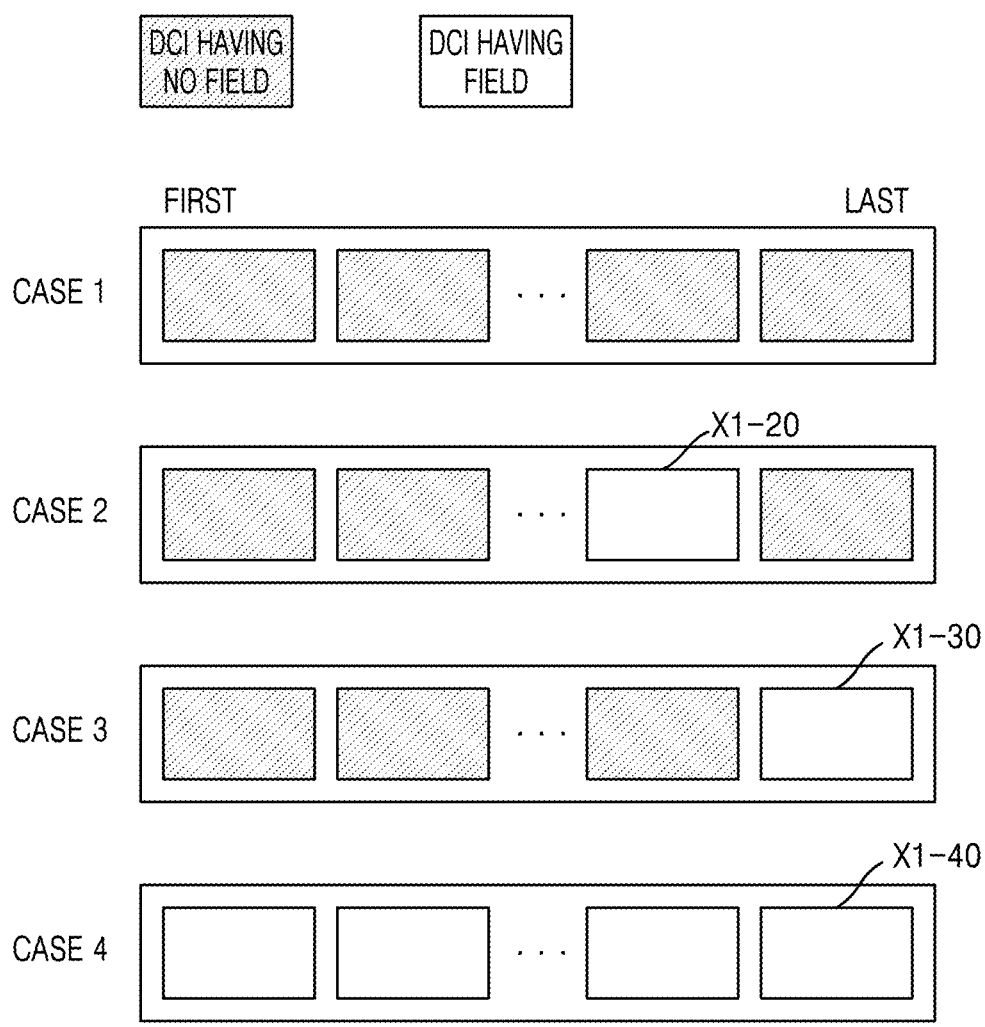
FIG. 18 illustrates a diagram for describing a method of arranging DCIs indicating PUCCH transmission at a same timepoint, according to an embodiment of the disclosure.

FIG. 18 illustrates a diagram for describing a method of arranging DCIs indicating PUCCH transmission at the same timepoint, according to an embodiment of the disclosure. Referring to FIG. 18, DCI indicating PUCCH transmission at the same timing may be first arranged (or indexed) based on serving cell indexes and then arranged based on PDCCH monitoring occasions. For example, as shown in FIG. 18, there may be a case where there is no PDSCH-to-HARQ feedback timing indicator field in all DCI, a case where there is no PDSCH-to-HARQ feedback timing indicator field in the last DCI as a result of arrangement, a case where there is a PDSCH-to-HARQ feedback timing indicator in the last DCI as a result of arrangement, and a case where there is a PDSCH-to-HARQ feedback timing indicator in all the DCI as a result of arrangement. In an embodiment of the disclosure, a PUCCH resource indicated by the last DCI between DCI format 1_0 and DCI format 1_1 including a value of the PDSCH-to-HARQ feedback timing indicator may be used. Thus, in Case 1, there is no corresponding DCI, such that the terminal may not be able to determine a PUCCH resource. A PUCCH resource indicated by DCI corresponding to X1-20 may be used in Case 2, a PUCCH resource indicated by DCI corresponding to X1-30 may be used in Case 3, and a PUCCH resource indicated by DCI corresponding to X1-40 may be used in Case 4. The DCI used in determining a PUCCH resource may not exist or may become different according to a DCI format for scheduling a PDSCH or an arrangement order of DCI, increasing the complexity of the terminal and the base station.

Figure 19:
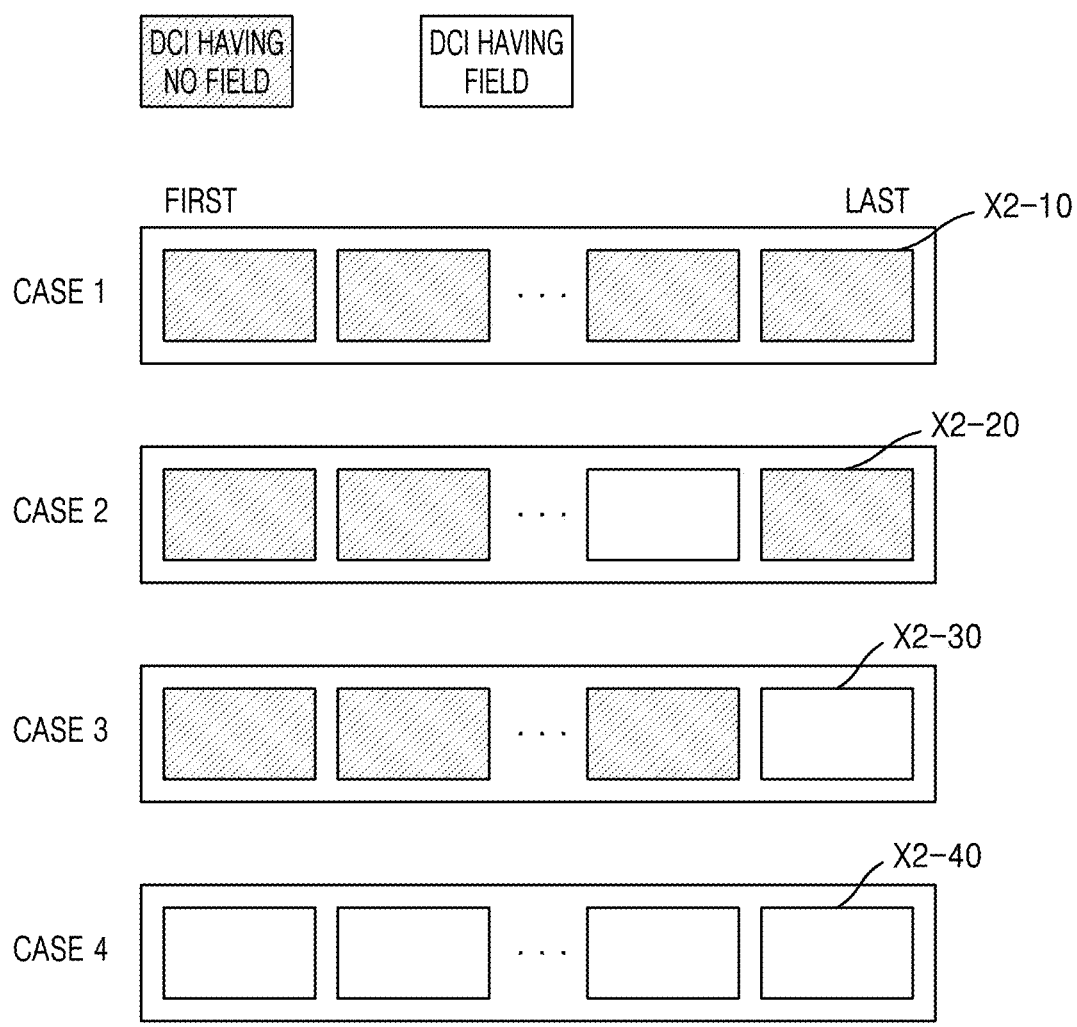
FIG. 19 illustrates a diagram for describing a method of arranging DCIs indicating PUCCH transmission at a same timepoint, according to an embodiment of the disclosure.

FIG. 19 illustrates a diagram for describing a method of arranging DCIs indicating PUCCH transmission at the same timepoint, according to an embodiment of the disclosure. Referring to FIG. 19, the method described with reference to FIG. 18 may be improved. With a method to be described with reference to FIG. 19, DCI indicating PUCCH transmission at the same timing may be first arranged (or indexed) based on serving cell indexes and then arranged (or indexed) based on PDCCH monitoring occasions. Thereafter, the last DCI among the above-described arranged (or indexed) DCI may be used to determine a PUCCH resource, regardless of existence of a PDSCH-to-HARQ feedback timing indicator field in DCI. That is, regardless of a DCI format for scheduling a PDSCH or a DCI arrangement order, the last DCI X2-10, X2-20, X2-30, and X2-40 after arrangement may be used as DCI for determining a PUCCH transmission resource.

Figure 20:
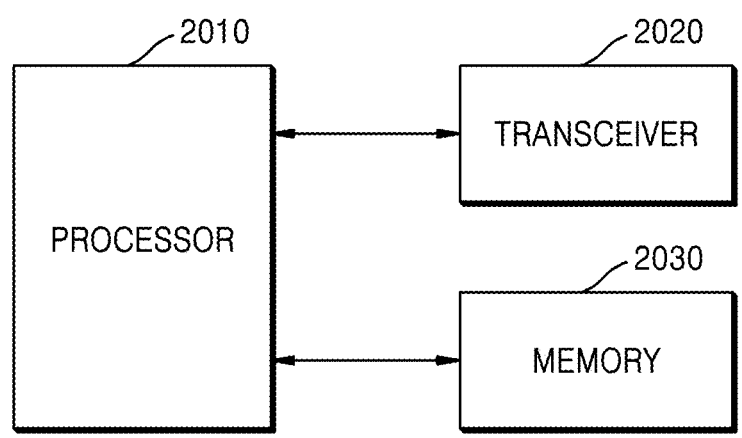
FIG. 20 illustrates a block diagram of a terminal according to an embodiment of the disclosure.
Figure 21:
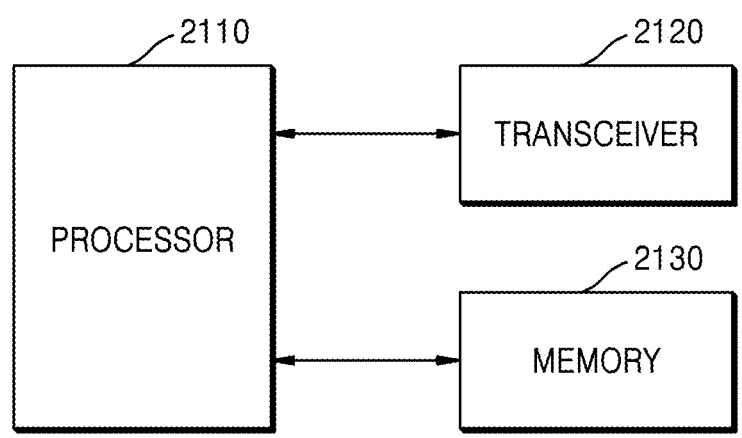
FIG. 21 illustrates a block diagram of a base station according to an embodiment of the disclosure.

To perform the embodiments of the disclosure, a transmitter, a receiver, and a processor of each of the terminal and the BS are illustrated in FIGS. 20 and 21. To calculate an actual data rate and execute a transmission and reception method in the first embodiment or second embodiment of the disclosure, a receiver, a processor, and a transmitter of each of the base station and the terminal may operate according to each of the above-described embodiments of the disclosure.

FIG. 20 illustrates a block diagram of a terminal according to an embodiment of the disclosure.

Referring to FIG. 20, the terminal according to the disclosure may include a processor 2010, a transceiver 2020, and a memory 2030. The transceiver 2020 may include a receiver and a transmitter. The transceiver 2020 may transmit and receive a signal to and from the BS. The signal may include control information and data. To this end, the transceiver 2020 may include an RF transmitter that up-converts and amplifies a frequency of a transmission signal and an RF receiver that low-noise-amplifies a received signal and down-converts a frequency.

The transceiver 2020 may receive a signal through a radio channel and output the received signal to the processor 2010, and transmit a signal output from the processor 2010 through the radio channel. The processor 2010 may control a series of processes such that the terminal operates according to the above-described embodiment of the disclosure. For example, the transceiver 2020 may receive control information and data, including scheduling information for data transmission, from the base station. In an embodiment of the disclosure, the processor 2010 may determine an UL control channel and a signal resource and perform corresponding signal processing, based on the above-described control information. Thereafter, the transceiver 2020 may transfer signals that need transmission to the base station.

FIG. 21 illustrates a block diagram of a base station according to an embodiment of the disclosure.

As shown in FIG. 21, the base station according to the disclosure may include a processor 2110, a transceiver 2120, and a memory 2130. The transceiver 2120 may include a receiver and a transmitter. The transceiver may transmit and receive a signal to and from the terminal. The signal may include control information and data. To this end, the transceiver 2120 may include an RF transmitter that up-converts and amplifies a frequency of a transmission signal and an RF receiver that low-noise-amplifies a received signal and down-converts a frequency. The transceiver 2120 may receive a signal through a radio channel and output the received signal to the processor 2110, and transmit a signal output from the processor 2110 through the radio channel.

The processor 2110 may control a series of processes such that the base station operates according to the above-described embodiment of the disclosure. For example, the processor 2110 according to an embodiment of the disclosure may generate control information by using at least a part of information such as a processing time of the terminal, a radio resource scheduling state, etc.

Thereafter, the transceiver 2120 may transmit the generated control information or receive a feedback or UL data signal of the terminal.

Meanwhile, the embodiments disclosed in the present specification and drawings have been provided to easily describe the disclosure and to help understanding of the disclosure, and are not intended to limit the scope of the disclosure. In other words, it is apparent to one of ordinary skill in the art that various changes may be made thereto without departing from the scope of the disclosure. Further, each of the above-described embodiments of the disclosure may be practiced in combination. For example, the first embodiment of the disclosure and the second embodiment of the disclosure may be applied in combination, or a part of the first embodiment of the disclosure and a part of the second embodiment of the disclosure may be applied in combination. In addition, the above-described embodiments of the disclosure may also be carried out in modified examples such as an LTE system, a 5G system, etc., based on the technical spirit of the above-described embodiments of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
receiving a plurality of downlink control information (DCI) from a base station, wherein a slot for a physical uplink control channel (PUCCH) indicated based on the plurality of the DCI is same;
identifying a plurality of DCI received prior to a predetermined time before a first symbol of the slot;
indexing the plurality of DCI based on indexes of serving cells and indexes of physical downlink control channel (PDCCH) monitoring occasion, wherein, in case that a first PDCCH monitoring occasion of first DCI and a second PDCCH monitoring occasion of second DCI are overlapped on a time domain and a last symbol of the first PDCCH monitoring occasion is located after a last symbol of the second PDCCH monitoring occasion, an index of the first DCI is greater than an index of the second DCI;
determining a PUCCH resource based a last DCI from among the indexed plurality of DCI; and
transmitting the PUCCH including hybrid automatic repeat request (HARD) acknowledgement (HARQ-ACK) information to the base station based on the determined PUCCH resource,
wherein:
in case that a physical downlink shared channel (PDSCH)-to-HARQ feedback timing indicator field is present in a DCI among the plurality of DCI, a slot indicated by the DCI is determined based on information in the PDSCH-to-HARQ feedback timing indicator field in the plurality of DCI; and
in case that the PDSCH-to-HARQ feedback timing indicator field is not present in the DCI among the plurality of DCI, the slot indicated by the DCI is determined based on a radio resource control (RRC) signaling received from the base station.

2. The method of claim 1, wherein the RRC signaling includes a value of dl-DataToUL-ACK, and
wherein the determining of the PUCCH resource based on the RRC signaling received from the base station comprises determining the PUCCH resource based on the value of dl-DataToUL-ACK.

3. The method of claim 1, wherein the PUCCH further includes at least one of scheduling request (SR) information or channel state information (CSI).

4. The method of claim 1, wherein a format of the plurality of DCI is DCI format 1_1.

5. A terminal in a wireless communication system comprising:
a transceiver; and
at least one controller configured to:
receive a plurality of downlink control information (DCI) from a base station wherein a slot for a physical uplink control channel (PUCCH) indicated based on the plurality of the DCI is same;
identify a plurality of DCI received prior to a predetermined time before a first symbol of the slot;
index the plurality of DCI based on indexes of serving cells and indexes of PDCCH monitoring occasion, wherein, in case that a first PDCCH monitoring occasion of first DCI and a second PDCCH monitoring occasion of second DCI are overlapped on a time domain and a last symbol of the first PDCCH monitoring occasion is located after a last symbol of the second PDCCH monitoring occasion, an index of the first DCI is greater than an index of the second DCI;
determine a PUCCH resource based on a last DCI from among the indexed plurality of DCI; and
transmit the PUCCH including hybrid automatic repeat request (HARQ) acknowledgement (HARQ-ACK) information to the base station based on the determined PUCCH resource,
wherein the at least one controller is further configured to:
in case that a physical downlink shared channel (PDSCH)-to-HARQ feedback timing indicator field is present in a DCI among the plurality of DCI, a slot indicated by the DCI is determined based on information in the PDSCH-to-HARQ feedback timing indicator field in the plurality of DCI; and
in case that the PDSCH-to-HARQ feedback timing indicator field is not present in the DCI among the plurality of DCI, the slot indicated by the DCI is determined based on a radio resource control (RRC) signaling received from the base station.

6. The terminal of claim 5, wherein the RRC signaling includes a value of dl-DataToUL-ACK, and
wherein the at least one controller is further configured to determine the PUCCH resource based on the value of dl-DataToUL-ACK.

7. The terminal of claim 5, wherein the PUCCH further includes at least one of scheduling request (SR) information or channel state information (CSI).

8. The terminal of claim 5, wherein a format of the plurality of DCI is DCI format 1_1.

* * * * *